United States Patent [19]

Tchao

[11] Patent Number: 5,563,996
[45] Date of Patent: Oct. 8, 1996

[54] COMPUTER NOTE PAD INCLUDING GESTURE BASED NOTE DIVISION TOOLS AND METHOD

[75] Inventor: Michael C. Tchao, Palo Alto, Calif.

[73] Assignee: Apple Computer, Inc., Cupertino, Calif.

[21] Appl. No.: 127,211

[22] Filed: Sep. 24, 1993

Related U.S. Application Data

[63] Continuation-in-part of Ser. No. 868,013, Apr. 13, 1992, Pat. No. 5,398,310.

[51] Int. Cl.$^6$ .................................................. G09G 5/34
[52] U.S. Cl. ........................................ 395/144; 395/155
[58] Field of Search ............................... 395/144–149, 395/24, 155, 143; 382/24

[56] References Cited

U.S. PATENT DOCUMENTS

| | | | |
|---|---|---|---|
| 5,036,544 | 7/1991 | Sakaue et al. ............................ | 382/24 |
| 5,091,964 | 2/1992 | Shimomura ............................... | 382/9 |
| 5,148,522 | 9/1992 | Okazaki .................................... | 395/161 |
| 5,220,649 | 6/1993 | Foricer ..................................... | 395/148 |
| 5,237,651 | 8/1993 | Randall .................................... | 395/148 |
| 5,283,862 | 2/1994 | Lund ........................................ | 395/155 |
| 5,289,169 | 2/1994 | Corfield et al. ......................... | 340/144 |
| 5,309,555 | 5/1994 | Akins et al. ............................. | 395/157 |
| 5,313,528 | 5/1994 | Nishida .................................... | 382/23 |
| 5,317,688 | 5/1994 | Watson et al. .......................... | 395/161 |
| 5,319,747 | 6/1994 | Gerrissen et al. ...................... | 395/155 |
| 5,327,528 | 7/1994 | Hidaka et al. ........................... | 395/155 |
| 5,398,310 | 3/1995 | Tchao et al. ............................. | 395/144 |

OTHER PUBLICATIONS

Microsoft®Word®2.0 Display examples, released between 1989–1991.
Boreland®Quatro Pro®2.0, User's Guide, 1990, pp. 253–255, Function buttons.
Microsoft®Excel®4.0, Display examples, released between 1987–1992.
Baumgarten, Using WordPerfect®5.1, Que®Corporation, pp. 27–31, 49–51, and 177–178, (1989).
O'Connor, Rory J., "Apple Banking on Newton's Brain", Apr. 22, 1992, San Jose Mercury News.
Weiman, Liza and Moran, Tom, "A Step Toward the Future", Aug. 1992, Macworld Magazine.
Soviero, Marcelle M., "Your World According to Newton", Sep. 1992, Popular Science Magazine.
Abatemarco, Fred, "From the Editor", Sep. 1992, Popular Science Magazine.

*Primary Examiner*—Mark K. Zimmerman
*Assistant Examiner*—Rudolph J. Buchel
*Attorney, Agent, or Firm*—Hickman Beyer & Weaver

[57] ABSTRACT

A method for manipulating notes on a screen of a computer display characterized by: (a) generating an initial note area; (b) dividing the initial note area into a plurality of note areas in response to at least one division gesture implemented by a pointing device, where each division gesture creates a header bar, including function buttons, on the computer display which visually separates two adjacent note areas; (c) modifying the size of a selected note area in response to a sizing gesture made to a header bar; and (d) scrolling in at least one note area in response to a scrolling command. Step (b) includes the steps of detecting a division gesture made on the computer screen by a pointing device, and then creating a header bar at a location indicated by the division gesture. Step (c) includes the steps of detecting the selection of a header bar with a pointing device, detecting a subsequent sizing gesture made by the pointing device, and moving the header bar as indicated by the sizing gesture. Step (d) includes the steps of detecting a scrolling command, and scrolling the note areas in a direction indicated by the scrolling command such that the note areas move in a quantized fashion.

27 Claims, 23 Drawing Sheets

COMPUTER NOTE PAD INCLUDING GESTURE BASED NOTE DIVISION TOOLS AND METHOD

CROSS-REFERENCE TO RELATED APPLICATIONS

This application is a continuation-in-part of U.S. Ser. No. 07/868,013, now U.S. Pat. No. 5,398,310, filed on Apr. 13, 1992, naming Tchao and Capps as inventors, and entitled "Method for Manipulating Notes on a Computer Display," which is incorporated herein by reference for all purposes.

BACKGROUND OF THE INVENTION

The present invention relates generally to the manipulation of images on a computer screen, and more particularly methods for manipulating images on the screen of a pen-based computer system.

A pen-based computer system is a small, often hand-held, computer system where the primary method for inputting data includes a "pen" or stylus. A typical pen-based computer system is housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of the stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen. With suitable recognition software, text and numeric information can also be entered into the pen-based computer system in a similar fashion.

Users often want to input more than one screen-full of information into their computer systems. To accomplish this, computer systems of the prior art have adopted two different input and display techniques. With a first technique, the screen images are treated as "pages" of a notepad. Users can then either sequentially access pages by "flipping" back or forth through the notepad, or they can jump to a particular page by page number. A second technique is to consider the screen of the display assembly to be a "window" on a long, continuous scroll of paper. The "scroll" is moved past the imaginary window (or the window is moved along the scroll) to provide a partial display of the contents of the scroll on the computer screen.

Both of these techniques have their advantages and disadvantages. The paging technique has the disadvantage of having a fixed page size which is usually equal to the size of the computer's screen. In consequence, if an image is too big to fit on one page, it must be divided to fit on two or more separate pages. While this is not particularly limiting for text, it makes the handling of large graphical images difficult. On the positive side, "paging" tends to be an intuitive way for users to access multiple screens of information. Users are familiar with the use of conventional books, notebooks, and notepads, all of which are essentially page based artifacts. An example of the intuitive nature of paging involves visually locating an image which was created on a particular page of memory. If, for example, a user knows that he drew a particular image in the lower right-hand corner of a page, he can quickly "flip" through the multiple pages while fixing his eyes on the lower right-hand corner of the screen to quickly spot the appropriate image.

The advantages and disadvantages of the scrolling technique are almost precisely the reverse of the advantages and disadvantages of the paging technique. An advantage of the scrolling technique is that images of virtually any length can be created. A disadvantage of the scrolling technique is that it is less intuitive than the paging technique. Using the previous example, finding a particular image by scrolling tends to be more difficult than finding the image by paging. This is due, in part, to the fact that when scrolling through the images stored in the computer, a particular desired image can be located at any vertical location on the screen, requiring a user to visually search a much larger image area. Also, with the scrolling technique it is more difficult for a user to know his or her relative location in a document. For example, with the paging technique a user might intuitively know that a desired image is about on page twelve, or is about two thirds of the way through the document. This type of intuitive knowledge is more difficult to achieve with the scrolling technique.

A further disadvantage of the scrolling technique is that it is inherently slow since images on the screen must not be moved so fast that they cannot be viewed. This can make the viewing of large amounts of data by scrolling techniques a time consuming process.

Yet another disadvantage of scrolling techniques is that there is no clear division between adjacent but unrelated images. For example, if a user first writes a letter and then makes a sketch, it would be desirable to make a clear division between these two unrelated items. This disadvantage also applies to a lesser extent to paging techniques when two or more unrelated items are placed on a single page.

SUMMARY OF THE INVENTION

In the present invention, images are grouped into note areas which form part of a continuous scroll. These notes are manipulated by: (a) generating an initial note area on the screen of a computer display; (b) dividing the initial note area into a number of contiguous note areas in response to one or more division gestures implemented by a pointing device, where each division gesture creates a header bar on the screen which visually separates two adjacent note areas; (c) modifying the size of a selected note area in response to a sizing gesture made to a header bar associated with the selected note area; and (d) scrolling within the note areas in response to a scrolling command.

The initial note area is provided with a header which preferably includes a header bar, the date of creation, dedicated header function buttons, and other indicia. This initial note area can be considered to be of indeterminate or infinite height. Graphical, text, and data objects can be created within this initial note area.

When a user desires to make a new note, a division gesture is made on thecomputer display with a pointing device. For example, in a pen-based computer system a stylus can be moved substantially horizontally across the screen to indicate a division gesture. Once a division gesture is detected, the height of the preceding note is determined, and the height of the new note can be considered to be indefinite or infinite. Preferably, the division gesture creates a new header for the new note including a header bar and indicating the date of creation and/or other pertinent information.

Preferably, each header bar also allows the size of an adjacent note to be modified. By making a sizing gesture with the header bar, the height of the associated note can be modified to make the note longer or shorter.

The notes on the display are preferably scrolled in a fashion which is a hybrid between traditional paging and scrolling techniques. The scrolling technique of the present invention can be considered to be a "quantized" scroll where objects displayed on the screen tend to be located in the same area of the screen in which they were created. This is accomplished by scrolling in quantized jumps such that the header bar of a desired note jumps either to the top of the screen or to about its original creation location on the screen.

The note areas and quantized scroll of the present invention overcome many of the aforementioned problems of the prior art. Related objects can be grouped together in a single note, and notes longer than a screen length can be easily generated. The height of individual notes can be modified by the sizing gesture, and the quantized scrolling of the present invention allows for the quick, intuitive scan of a large number of notes.

These and other advantages of the present invention will become apparent to those skilled in the art upon a reading of the following specification of the invention and a study of the several figures of the drawing.

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
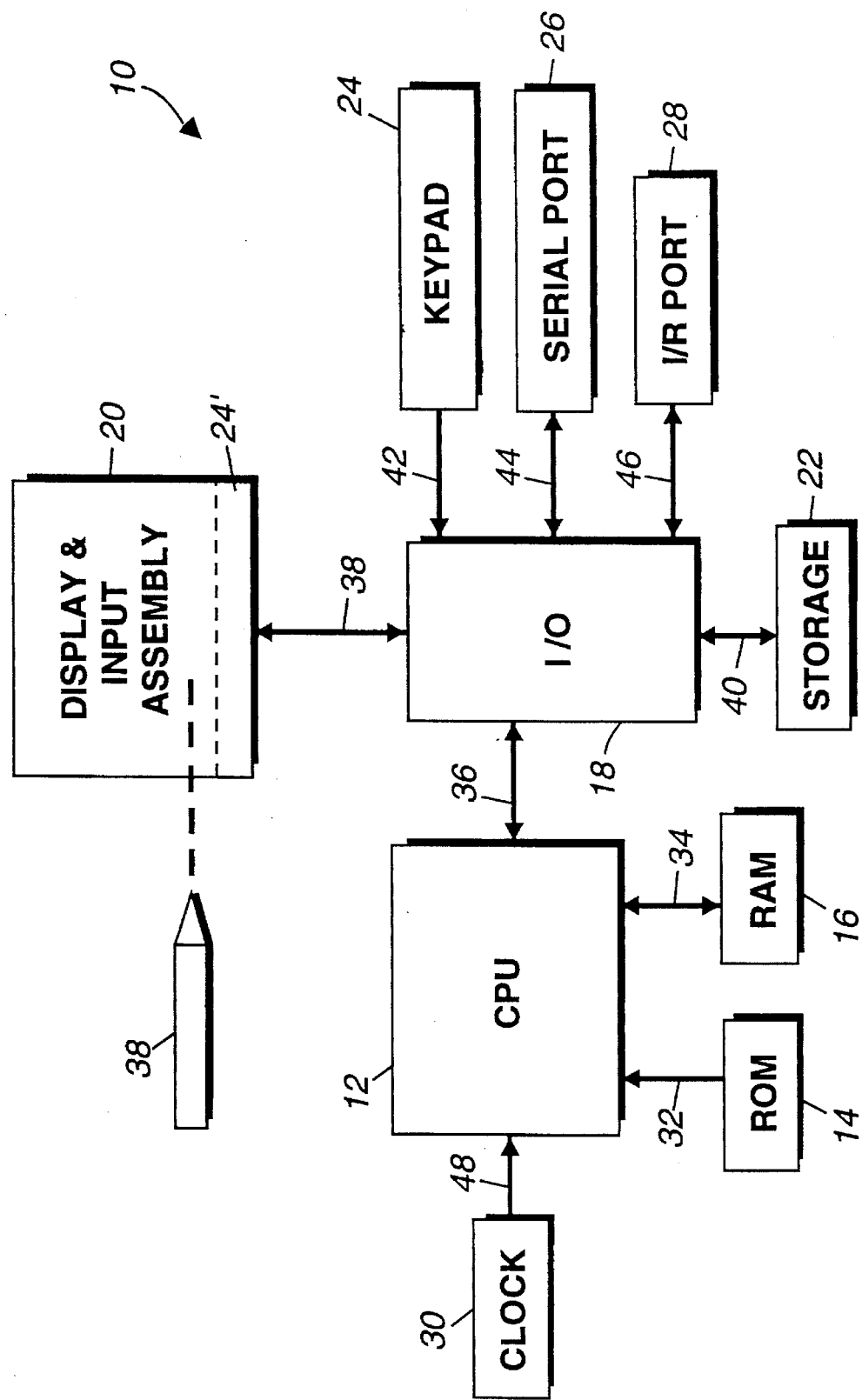
FIG. 1 is a block diagram of a pen-based computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also commercially available. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
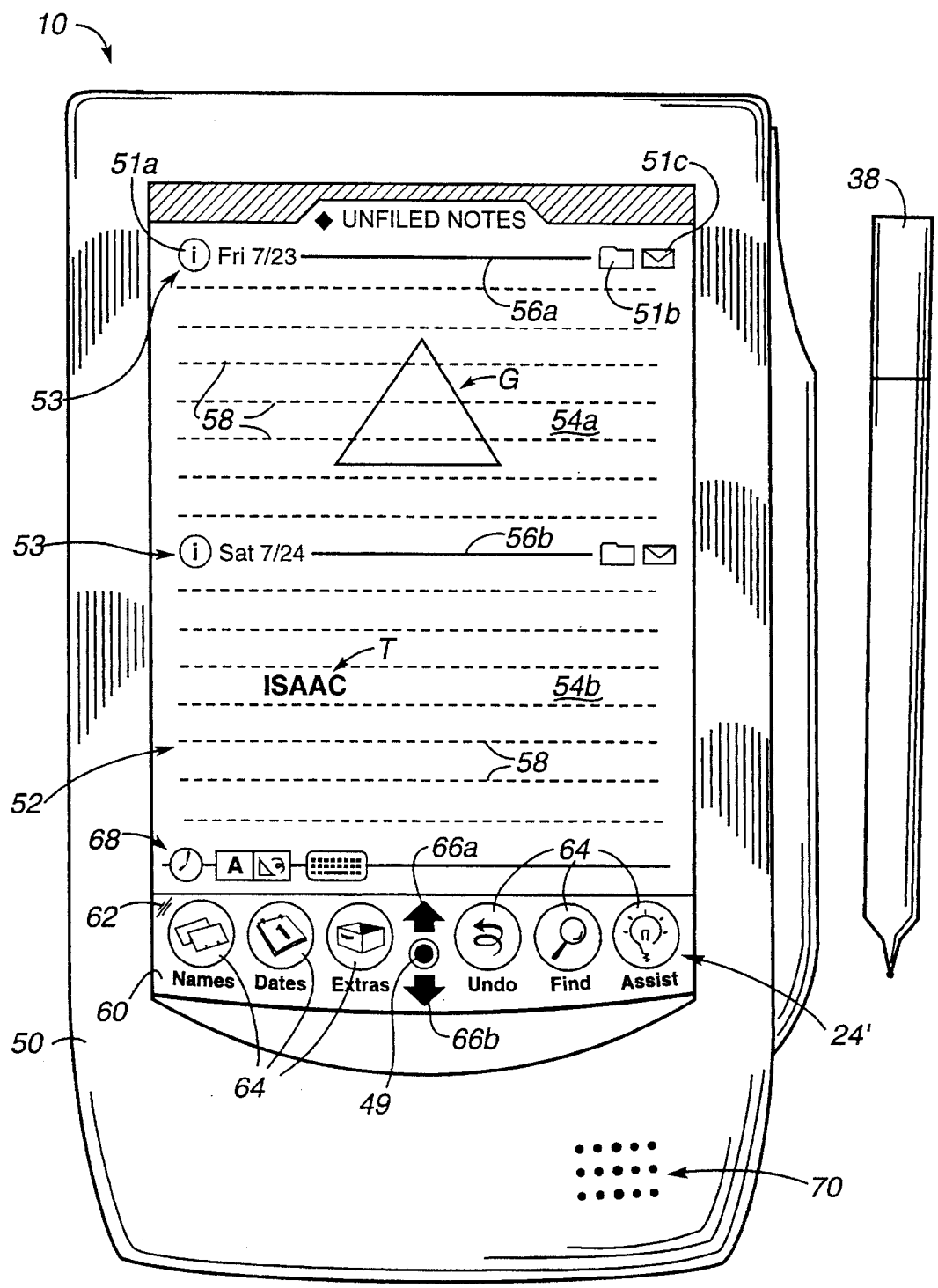
FIG. 2 is a pictorial representation of the screen of a computer display assembly of the present invention.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 30 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header 53 and a number of guidelines 58. The header 53 preferably includes a header bar 56a, the date of creation of the note area 54a, and one or more icons and "soft" dedicated header function buttons 51A, 51B, and 51C. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64, an "overview button" 49, and a pair of scroll buttons 66a and 66b. The operation of the note areas 54a, 54b, etc., scroll buttons 66a and 66b, and other aspects of computer system 10 are discussed in greater detail below.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970, filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

Figure 3:
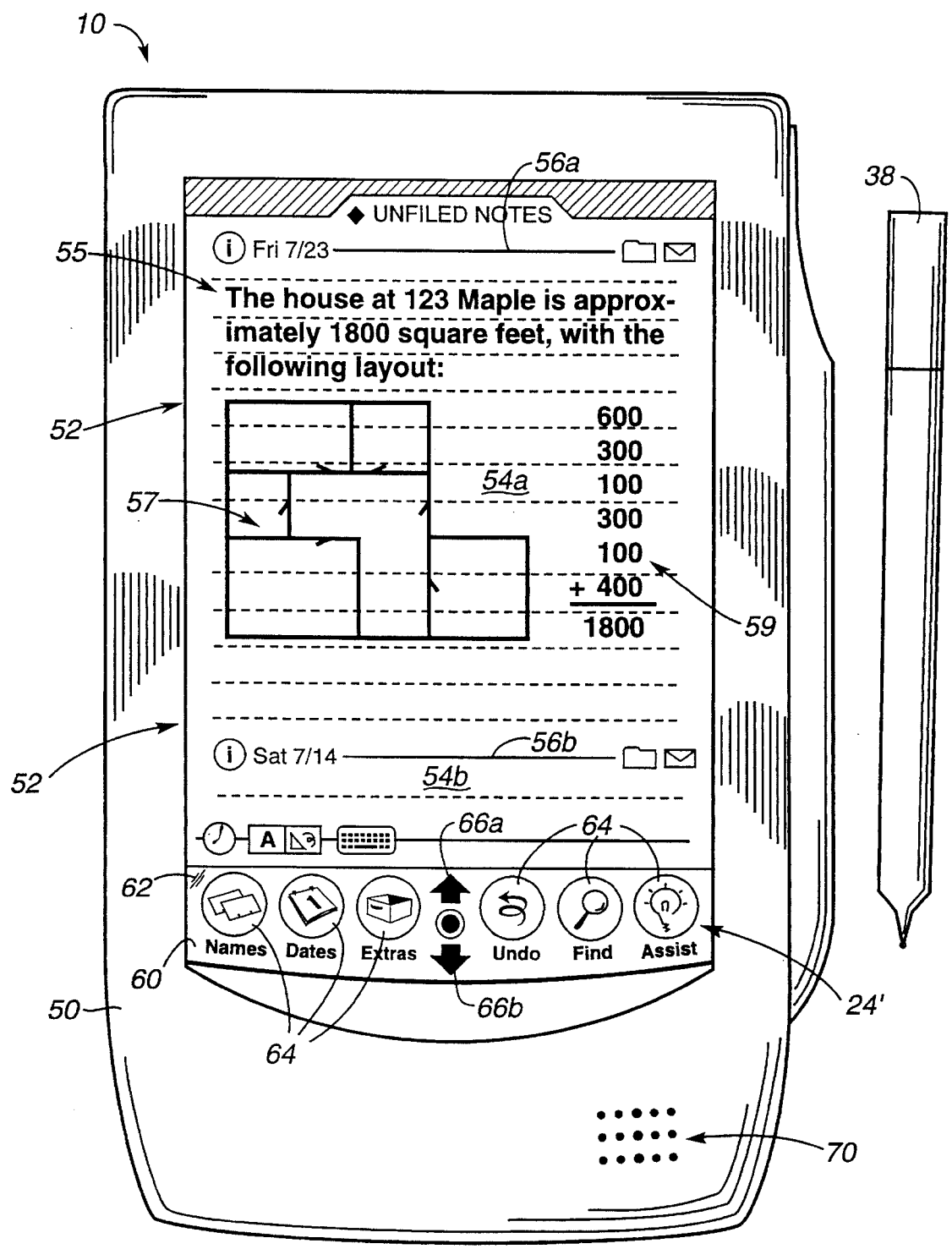
FIG. 3 illustrates the screen of FIG. 2 after graphical, text and data objects have been added, and after the screen has been divided into two note areas.

In FIG. 3, several types of images or objects have been entered into the computer system 10 by the stylus 38. More particularly, in first note area 54a (underneath first header bar 56a), a text object 55 describing a house at 123 Maple Street is entered near the top of the screen 52, a sketch of the layout for the house is entered as a graphic object 57, and calculations of the square footage have been entered as a data object 59. Second header bar 56b has been added to create second note area 54b, and to separate this note area from the first note area 54a.

Figure 4:
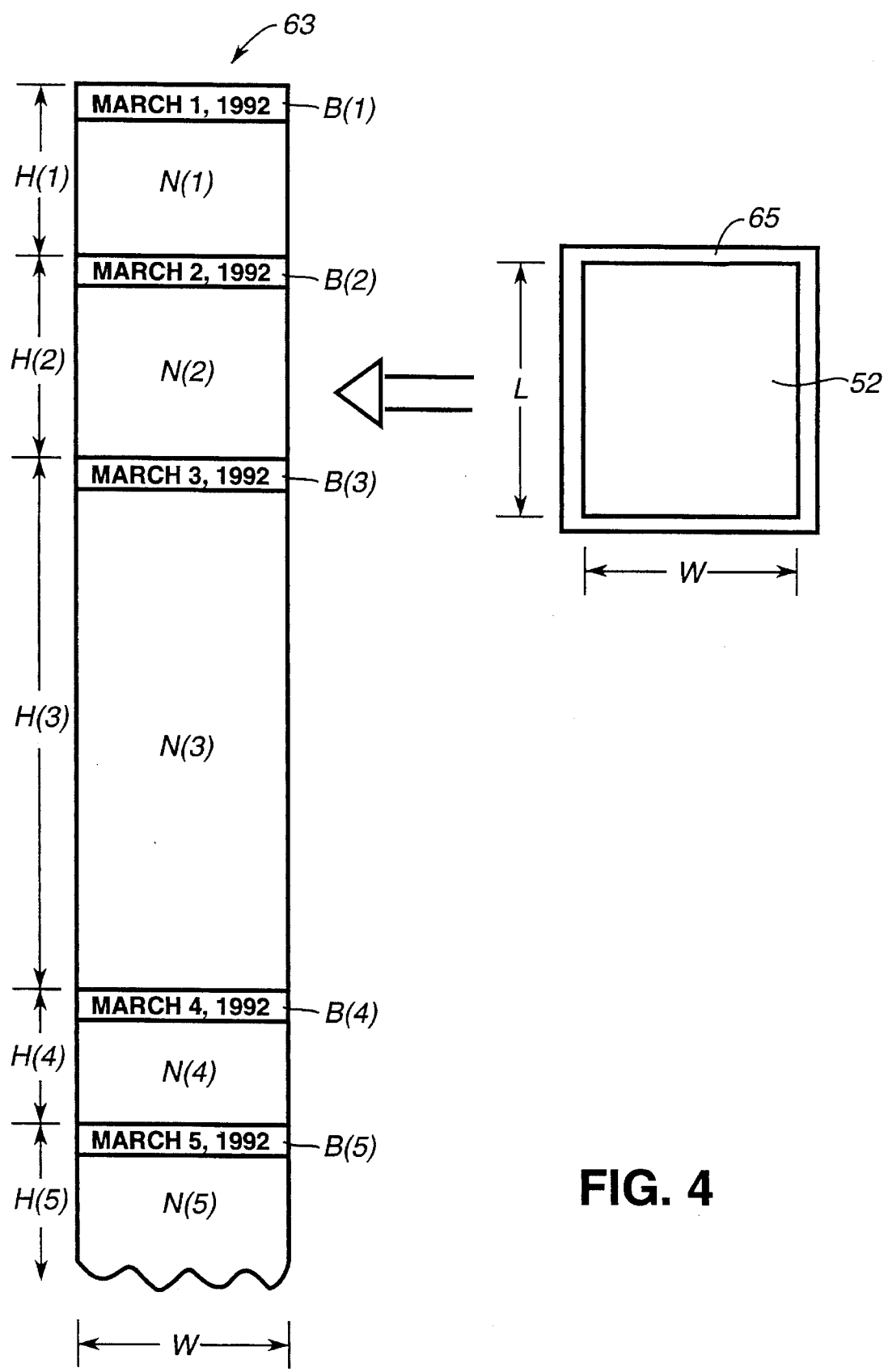
FIG. 4 graphically illustrates a number of note areas arranged in a scroll and a "window" representing the screen of the computer display.

A conceptual representation of the images seen on screen 52 will be discussed with reference to FIG. 4. In FIG. 4, the screen images can be conceptualized as being printed on a long scroll 63 of paper, where only a portion of the scroll can be viewed at a time through a window 65 (corresponding to the screen 52 of the display assembly 20). The width w of screen 52 is preferably equal to the width W of the scroll 63. If, however, the width w of the screen 52 is less than the width W of the scroll 63, the entire width W of the scroll 63 can be viewed by a lateral scroll, as is well known to those skilled in the art.

Also seen in FIG. 4, the scroll 63 includes an initial note area N(1) and can also include one or more additional note areas N(2), N(3), etc. All of the note areas have an associated header B(1), B(2), B(3), etc. along their upper edge.

As mentioned previously, portions of the scroll 63 can be viewed through the screen 52 of window 65. To view other portions of the scroll 63, the images are "scrolled" up or down past the screen 52. As used herein, an up-scroll will permit lower numbered note areas to be seen, and a down-scroll will allow higher numbered note areas to be seen. Therefore, an up-scroll can be visualized as moving the window 65 upwardly along the scroll 63, or by moving the scroll 63 downwardly past window 65. Similarly, a down-scroll can be visualized as moving the window 65 downwardly along the scroll 63, or by moving the scroll 63 upwardly past window 65.

Preferably, each of the note areas has the same width W. However, each of the note areas will have its own height depending upon where the header bar is drawn. For example, the height of the initial note N(1) is H(1), the height of the second note N(2) is H(2), the height of the third note N(3) is H(3), etc. The height of the last note of the scroll 63 (in this case H(5)) is indeterminate and can be considered infinite. Once a new header bar has been added to the bottom of note N(5), its height H(5) will become determinate, and the height of the new last note N(6) can be considered to be indeterminate or infinite.

Figure 5A:
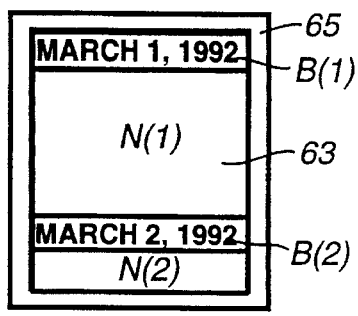
FIGS. 5a–5f illustrate six views of the scroll as seen through the window of FIG. 4.
Figure 5B:
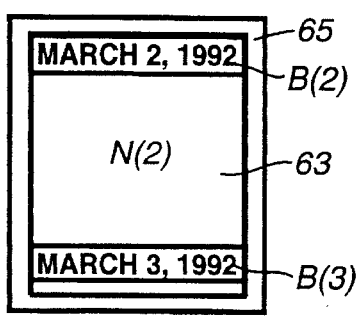
Figure 5C:
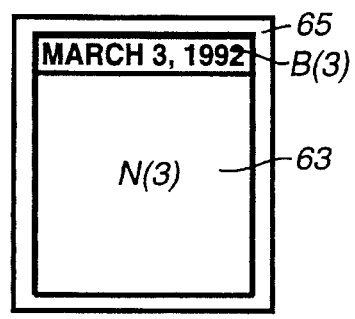
Figure 5D:
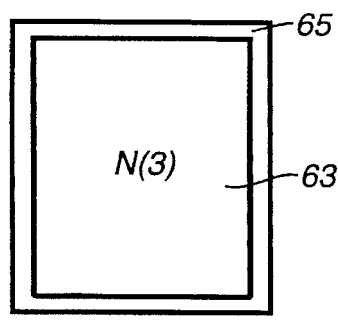
Figure 5E:
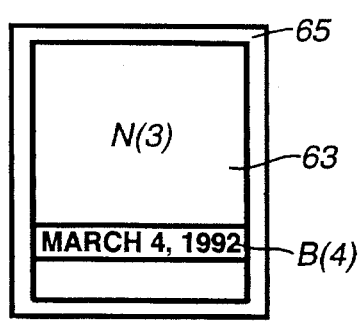
Figure 5F:
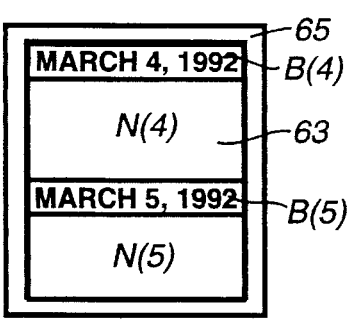

In FIGS. 5a–5f, a "quantized" down-scroll in accordance with the present invention will be described. In FIG. 5a, the window 65 is positioned at the top of scroll 63 to view the initial note N(1). The header bar B(1) of the initial note N(1) is at the top of the screen 52, and the header bar B(2) of additional note N(2) is positioned in the bottom third of screen 52. Upon the sensing of a down-scroll command by a user pressing button 66b, the header bar B(2) jumps to the top of screen 52 and the header bar B(3) moves onto the bottom portion of the screen 52. With another down-scroll command sensed as the button 66b is pressed, the header bar B(3) jumps to the top of screen 52 as shown in FIG. 5c. Since the height H(3) of note N(3) is greater than the length L of screen 52, only a portion of the note N(3) will be seen on the screen. In FIG. 5d, another down-scroll command permits the viewing of the middle of note N(3) without any header bars showing on the screen 52. Yet another down-scroll command will show the bottom portion of note N(3) along with the header bar B(4) of note N(4), as illustrated in FIG. 5e. Finally, in FIG. 5f, another down-scroll command will cause the header bar B(4) to jump to the top of screen 52 and the header bar B(5) will appear near the middle of the screen.

It should be apparent from the preceding description that the "quantized" scrolling technique of the present invention is a hybrid between prior art paging and scrolling techniques. In this invention, the images on the screen 52 can be viewed as if they were formed in a continuous scroll 63, but the scrolling action comprises discrete, quantized jumps rather than the continuous scrolling action of the prior art. In this way, various text, graphical and data objects will appear in approximately the same location on the screen 52 as they were when they were created, allowing a user to quickly jump through the images on scroll 63 to locate a desired object. For example, if a user knows that he drew a sketch near the lower left-hand corner of the screen 52, he can jump through the notes quickly, fixating his eye on the lower left-hand corner of the screen to find the appropriate image. The up-scroll technique operates in a similar fashion.

Figure 6:
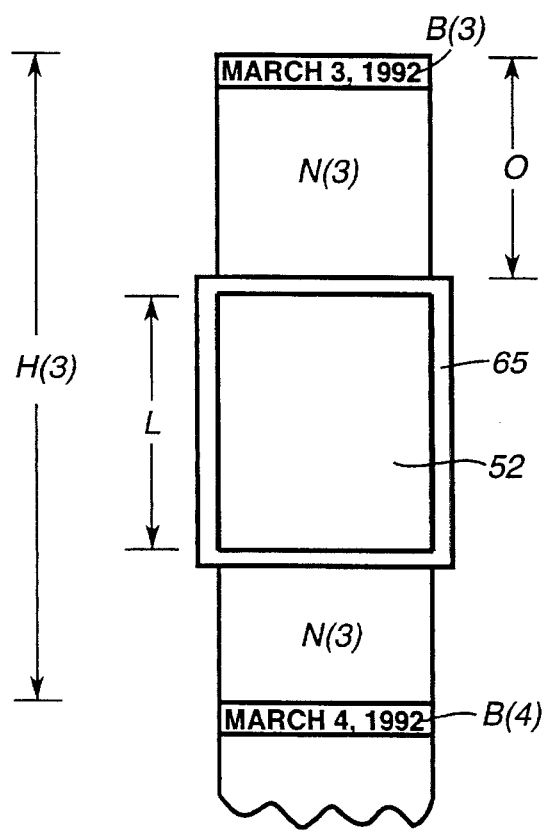
FIG. 6 illustrates the viewing of a note which has a height greater than the height of the viewing window.

FIG. 6 is used to illustrate the viewing of a note, such as note N(3), having a height greater than the length L of screen 52. Here, the window 65 is positioned near the middle of note N(3), corresponding to the image displayed in FIG. 5d. At this point, the header bar B(3) is offset from the top of screen 52 by an offset O. The offset O is used when re-drawing image on the screen 52, as will be discussed in greater detail subsequently.

Figure 7:
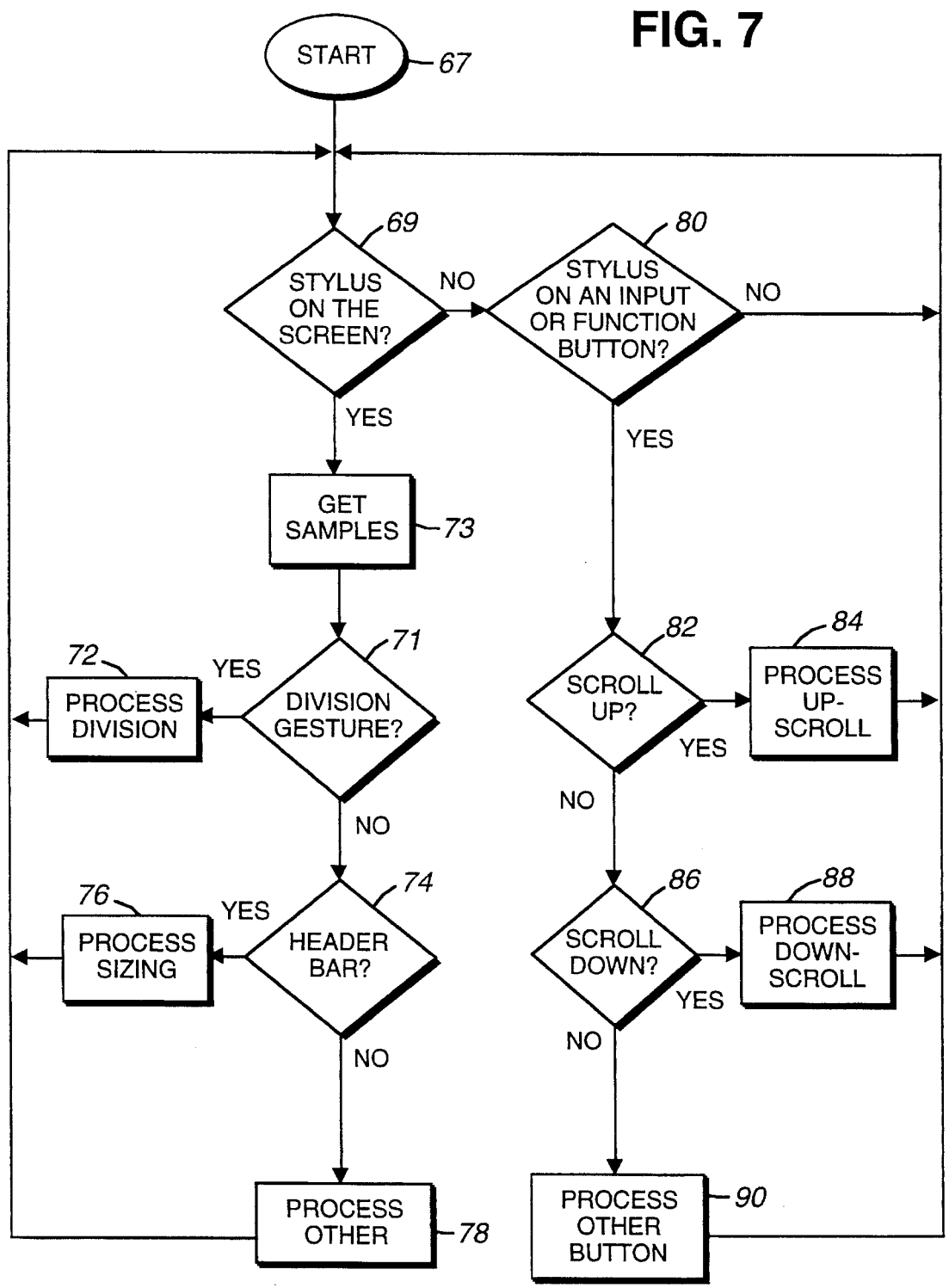
FIG. 7 is a flow diagram illustrating a method for manipulating notes on a computer display in accordance with the present invention.

A method for manipulating notes on a computer screen in accordance with the present invention will be discussed in greater detail with reference to FIG. 7. The process starts at 67, typically upon the power-up of the pen-based computer system 10. In a decision step 69 the CPU 12 decides whether the stylus 38 is positioned on the screen 52 of the computer system and, if it is, it stores sample points generated by display assembly 20 in a step 73. The CPU 12 then determines whether a division gesture is being made across the screen in a step 71. If the outcome of decision step 71 is that a division gesture is being made, the division gesture is processed in a step 72 and the CPU returns to step 69. If the decision of step 71 is that a division gesture had not been made, a decision step 74 determines whether the stylus is on a header bar. If it is, a sizing command is processed in a step 76, and the process continues with step 69. If the stylus is on the screen as determined by decision step 69, but it is not making a division gesture and is not on a header bar as determined by steps 71 and 74, the CPU 12 processes some other system function as indicated by step 78. These other system functions can include handwriting recognition, data recognition, etc.

If it is determined in step 69 that the stylus is not on the screen 52, the CPU 12 then determines whether the stylus is on an input button of the array of input buttons 24 or a header function button on header 53 in a decision step 80. If the stylus is on an input button, the CPU 12 determines whether it is on the scroll up button 66A in a decision step 82. If it is, the CPU 12 will process the scroll up command in a step 84 and then will return to step 69. If the CPU 12 determines that the scroll up button 66A is not being activated, it then determines whether the scroll down button 66B is being activated in a step 86. If it is, the scroll down command is processed in a step 88 and the process continues with step 69. If the CPU 12 has determined that a stylus is on an input or function button but it is neither on the scroll up button 66A nor the scroll down button 66B, other buttons are processed as indicated in step 90 and the process continues with step 69. These other process buttons 90 can include such functions as filing and routing as discussed below and/or searching, storing, retrieving, faxing, etc.

As mentioned previously, the start step 67 typically occurs on power start-up of the pen-based computer system 10. It can also occur upon a hard-reset of the system 10 by a reset button (not shown), or by a soft-reset activated by a command on screen 52.

The step 69 of determining whether the stylus is on the screen is well-known to those skilled in the art of the design of pen-based computer systems. Typically, the display assembly 20 will send a timed series of data points (e.g. the x-y coordinates of the stylus point) to the I/O circuitry 18 whenever a stylus 38 is on the screen 52. If the stylus 38 is stationary, the series of data points will be the same, and if the stylus 38 is moving the series of data points will be different.

Likewise, the step 80 of deciding whether the stylus is on an input button of the array of input buttons 24 or a header function button on header 53 is well known to those skilled in the art. The CPU 12 typically causes the array of input buttons 24 to be periodically scanned for an activated button. Software debounce routines are often used to eliminate false readings.

Figure 8:
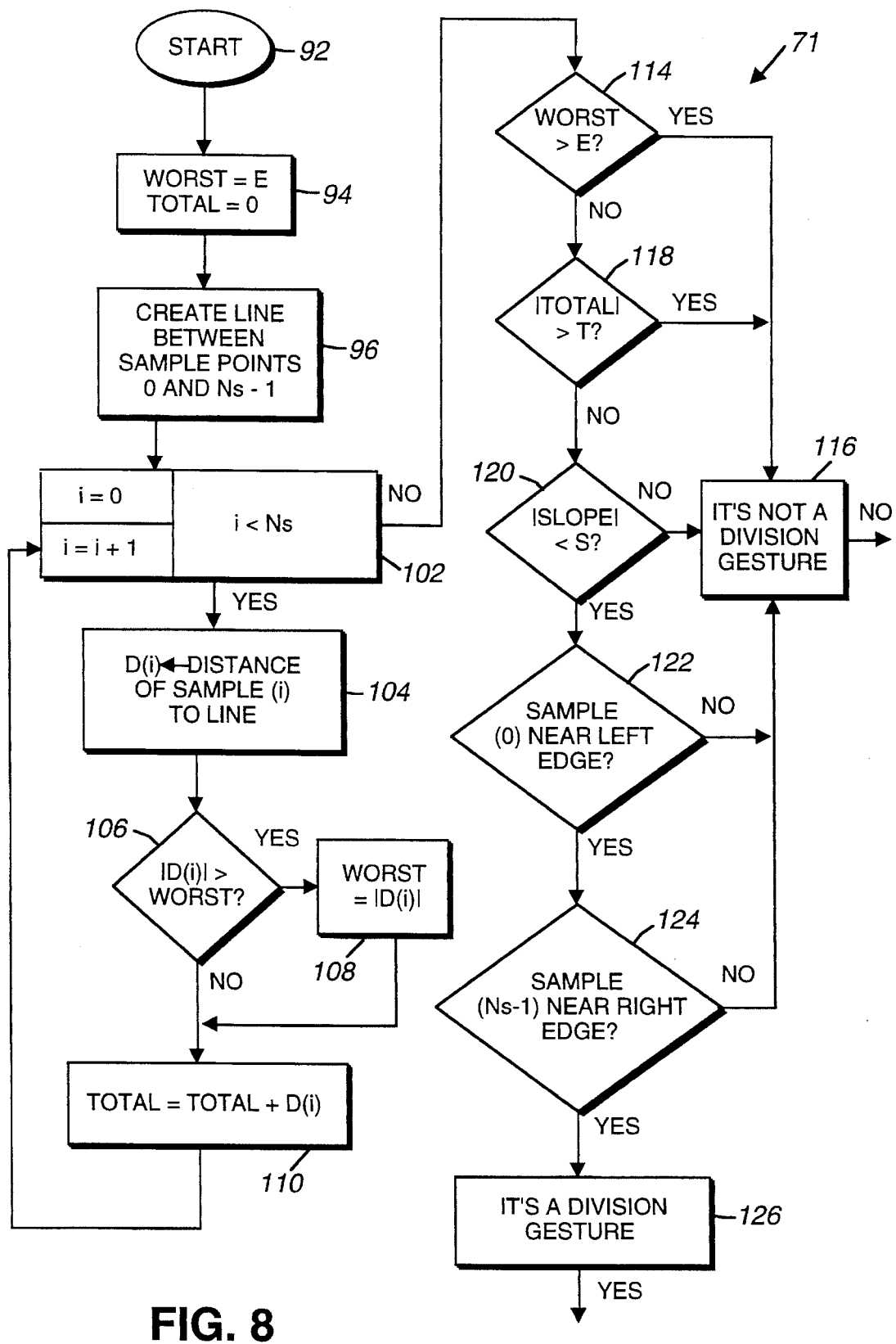
FIG. 8 is a flow diagram of a method for detecting a division gesture on the screen of a computer display assembly.

In FIG. 8, the step 71 of determining whether a stylus 38 is making a division gesture across the screen 52 is illustrated in greater detail. The step 71 starts at 92 and initializes certain parameters in a step 94. Two of these parameters are WORST, which is set to the value epsilon, and TOTAL, which is set to zero.

A division gesture in the present invention is a substantially horizontal line drawn across the surface 52 along substantially its entire width w. This gesture is internally represented by a number of sample points taken along the path of the stylus as it traverses the screen. If the total number of sample points for a given gesture is $N_S$, the sample points will be stored in a linear array SAMPLE ranging from SAMPLE(0) to SAMPLE($N_S$-1).

Figure 8A:
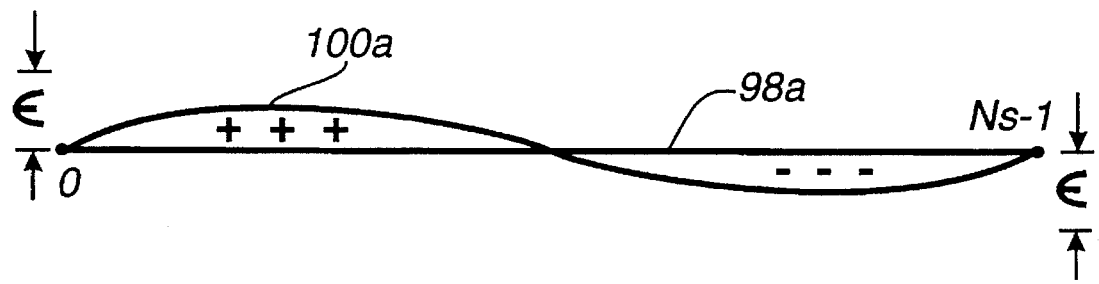
FIGS. 8A and 8B illustrate two of many potential gestures which can be made with a stylus, the first of which will be recognized as a division gesture and the second of which will not be recognized as a division gesture.
Figure 8B:
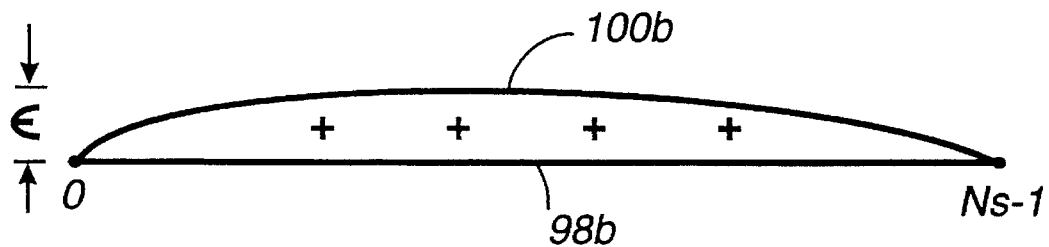

Next, in a step 96, a "theoretical" line is created by the CPU 12 by using sample points 0 and $N_S$- 1 as end-points. A theoretical line 98A created by a gesture 100A is shown in FIG. 8A, and a theoretical line 98B created by a gesture 100B is shown in FIG. 8B. Alternatively, a theoretical line can be created by making a least mean square (LMS) fit of at least some, and preferably a majority or all, of the $N_S$ data points. The algorithms for making a LMS fit from a set of data points are well known.

The next step comprises a iterative loop step 102 which steps through the sample points using a counter i ranging from 0 to $N_S$-1. In a first iteration of the iterative loop step 102, a variable D(i) is assigned the value of the distance of sample point SAMPLE (i) to the theoretical line in a step 104. In a decision step 106, the absolute value of D(i) is compared to WORST, and if it is greater than WORST, the value of WORST is updated to the absolute value of D(i) in a step 108. If the absolute value of D(i) is not greater than WORST, or if step 108 has been performed, TOTAL is updated in a step 110 to equal the previous value plus D(i). The steps 104–110 are then iteratively processed for each of the sample points. After the completion of the iterative loop step 102, i.e. after $N_S$ iterations, the farthest distance of a sample point from the theoretical line will be stored in the variable WORST, and the total of the signed differences of the $N_S$ sample points will be stored in the variable TOTAL. Next, the variable WORST is compared to epsilon in a decision step 114, and if WORST is greater than epsilon, it is determined that the gesture is not a division gesture as indicated at 116.

In FIGS. 8A and 8B, both the gestures 100A and 100B meet the requirement of step 114 of FIG. 8 because none of the $N_S$ sample points of gestures 100A or 100B are at a distance from the theoretical line 98A or 98B, respectively, which is greater than the predetermined value epsilon. In a preferred embodiment of the present invention, epsilon is chosen to be about six millimeters.

If it is determined in step 114 that the value of the variable WORST is less than epsilon, then a decision step 118 compares the value of TOTAL with a predetermined maximum total value T. In FIG. 8A, the value in TOTAL will be near zero because about half of the gesture 100A is above the theoretical line 98A and the other half of gesture 100A is below the line 98A. This will cause a cancellation of positive distances D(i) with negative distances D(i) to result in a near zero value for TOTAL. In contrast, the gesture 100B in FIG. 8B is entirely above the theoretical line 98B, resulting in a fairly large value for the variable TOTAL. If this large absolute value is greater than the predetermined value T, the gesture 100B is determined not to be a division gesture as indicated at 116. In the present embodiment, a value of T is approximately ten millimeters.

Next, the slope of the theoretical line is compared to a predetermined maximum slope S. The slope of the theoretical line is easily calculated as $\Delta Y/\Delta X$ between the sample points zero and $N_S-1$ and stored in the variable SLOPE. If the absolute value of SLOPE is greater than or equal to S, the CPU 12 determines that it is not a division gesture as indicated at 116. Preferably, the maximum value for S is approximately 10 degrees.

If, in a step 120, it is determined that the absolute value of SLOPE is less than the predetermined value S, it is determined in a step 122 whether SAMPLE(0) is near the left edge of the screen 52. If it is not, the gesture is determined not be a division gesture as indicated at 116. Currently, the SAMPLE(0) point must be within eight millimeters of the left edge of the screen 52 to be considered part of a division gesture.

If the SAMPLE (0) point is close enough to the left edge of screen 52, the right-most sample point SAMPLE ($N_S-1$) is compared to the right edge of the screen 52 in a step 124. If sample point SAMPLE ($N_S-1$) is not near the right edge, e.g. it is farther than eight millimeters from the right edge of screen 52, the gesture is determined not to be a division gesture as indicated at 116. If the last sample point is sufficiently close to the right edge, it is determined that the gesture is a division gesture as indicated at 126.

In summary, a theoretical line must meet the criteria of steps 114, 118, 120, 122, and 124 to be considered a division gesture. The failure of any one of these steps will result in the theoretical line being not considered a division gesture.

Figure 9:
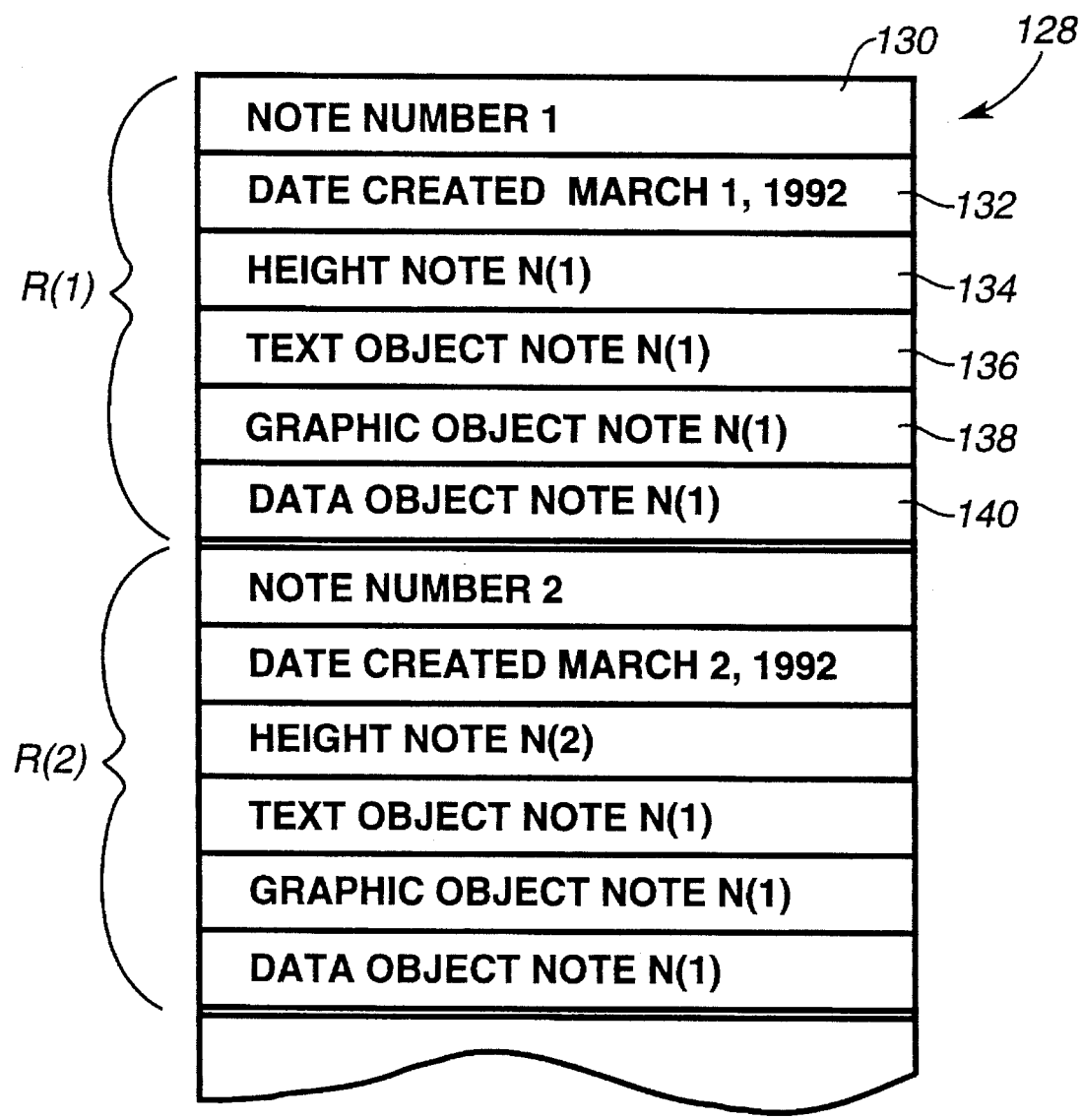
FIG. 9 illustrates the data structure of a note in accordance with the present invention.

In FIG. 9, a preferred data structure 128 for data stored within RAM 16 and/or mass storage 22 is illustrated. All the associated data for a particular note can be stored in a record area R in the data structure 128. For example, the information for note N(1) can be stored in record area R(1), and the information for note N(2) can be stored in record location R(2). Of course, various portions of a record could be stored in non contiguous locations in memory and then linked back to a particular record area by an appropriate pointer.

Taking record R(1) as an example, each record includes a number of discrete fields including a note number field 130, a creation date field 132, a height field 134, a text object field 136, a graphic object field 138, and a data object field 140. Each object field can, itself, contain other object fields of the same or different types. The note number field 130 stores the note number corresponding to that record. The date created field 132 includes the date of the note's creation. This date of creation can be automatically inserted into the date created field 132 by the operating system of the pen-based computer system 10. The height field 134 stores the height of the note as measured from the top of the current note's header bar to the top of the next adjacent note's header bar. If the note is the last note, the height will be considered to be indeterminate or infinite. Text objects, such as text objects 54 of FIG. 3, are stored in field 136, graphic objects such as graphic object 56 are stored in field 138, and data objects such as object 58 are stored in field 140.

It can be noted from the data structure 128 that the height of any note can be modified by changing the value stored in the height field 134. This feature allows a note to be re-sized, as will be discussed in greater detail with reference to FIGS. 11 and 12.

Figure 10:
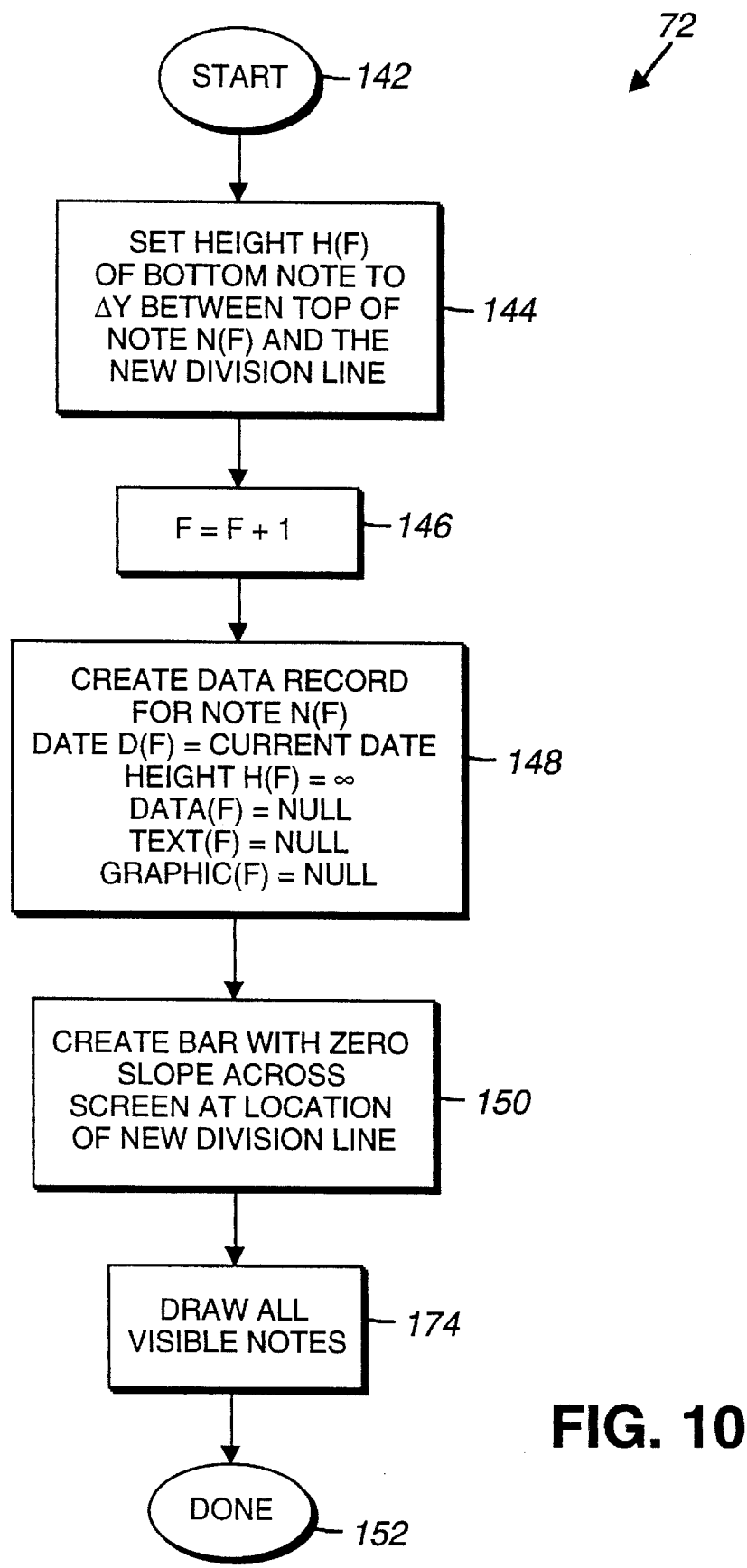
FIG. 10 is a flow diagram illustrating a method for processing the division gesture detected by the method illustrated in FIG. 8.

FIG. 10 illustrates the process division step 72 in greater detail. The process starts at 142 after a division gesture has been recognized by step 71. If F designates the final note number, the height H(F) of note N(F) is set to the distance $\Delta Y$ between the top of the header bar of note N(F) and the newly created header bar in step 144. This is accomplished by updating the height field 134 of record R(F). The number F is then incremented by 1 in a step 146 to indicate that a new note has been created.

A record R(F) for note N(F) is then created in a step 148. For example, the date field D(F) 132 is set for the current date, the height field H(F) 134 is set to infinity, and the text TEXT(F), graphic GRAPHIC(F), and data DATA(F) object fields 136, 138, and 140, respectively, are set to null. These actions create a new note area into which data, text, and graphic objects can be stored. In a step 150, a header bar having a zero degree slope is created at the location of the division line, and appropriate guidelines 58 are created for the new note area. Preferably, the header is provided with a creation date and header function buttons 51A, 51B, and 51C shown in FIG. 2. Next, all visible notes on the screen 52 are drawn in a step 174, which will be discussed in greater detail with reference to FIG. 13. The process division step 72 is then completed as indicated at 152.

Figure 11:
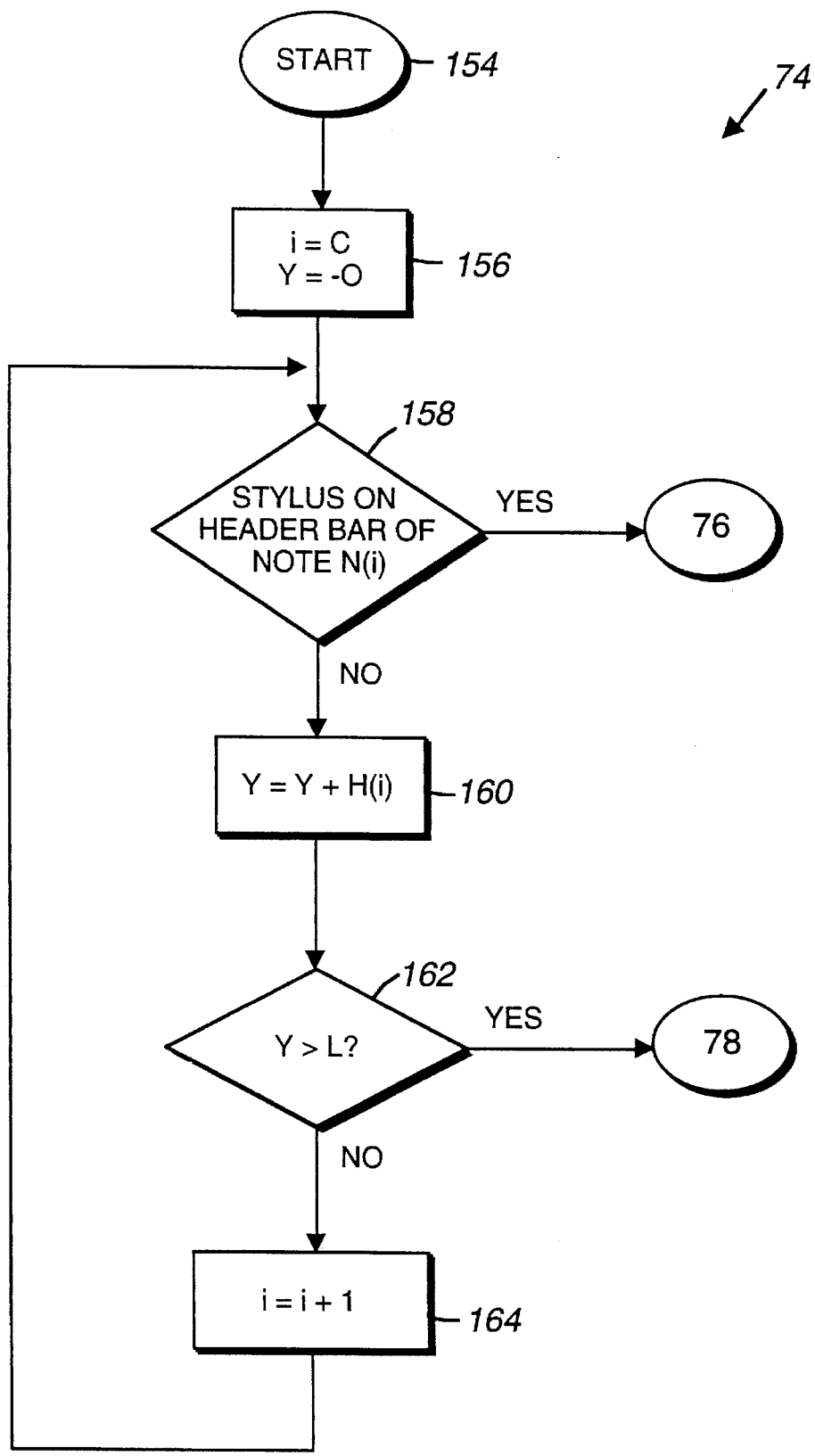
FIG. 11 is a flow diagram illustrating a method for detecting a sizing gesture of a selected note.

FIG. 11 illustrates, in greater detail, the step 74 of detecting a sizing gesture. Process 74 starts at 154, and an initialization step 156 initializes several process parameters. More particularly, in step 156 a counter i is set to the value of C, which is the current note number. The vertical distance Y is then set to the negative of the current; i.e. Y=–O.

In a step 158, it is determined whether the stylus is on the header bar of note N(i). If the stylus is on the header bar of note N(i), the CPU 12 processes the process sizing algorithm of step 76. If the stylus is not on the header bar of note N(i), then the variable Y is increased by the height H(i) of note N(i) in a step 160. If the variable Y is greater than L (the length of the screen) as determined by a decision step 162, then all visible header bars have been analyzed and the process continues with step 78. If step 162 determines that Y is not greater than L, then the counter i is incremented by one in a step 164 and the process is repeated starting at step 158.

Figure 12:
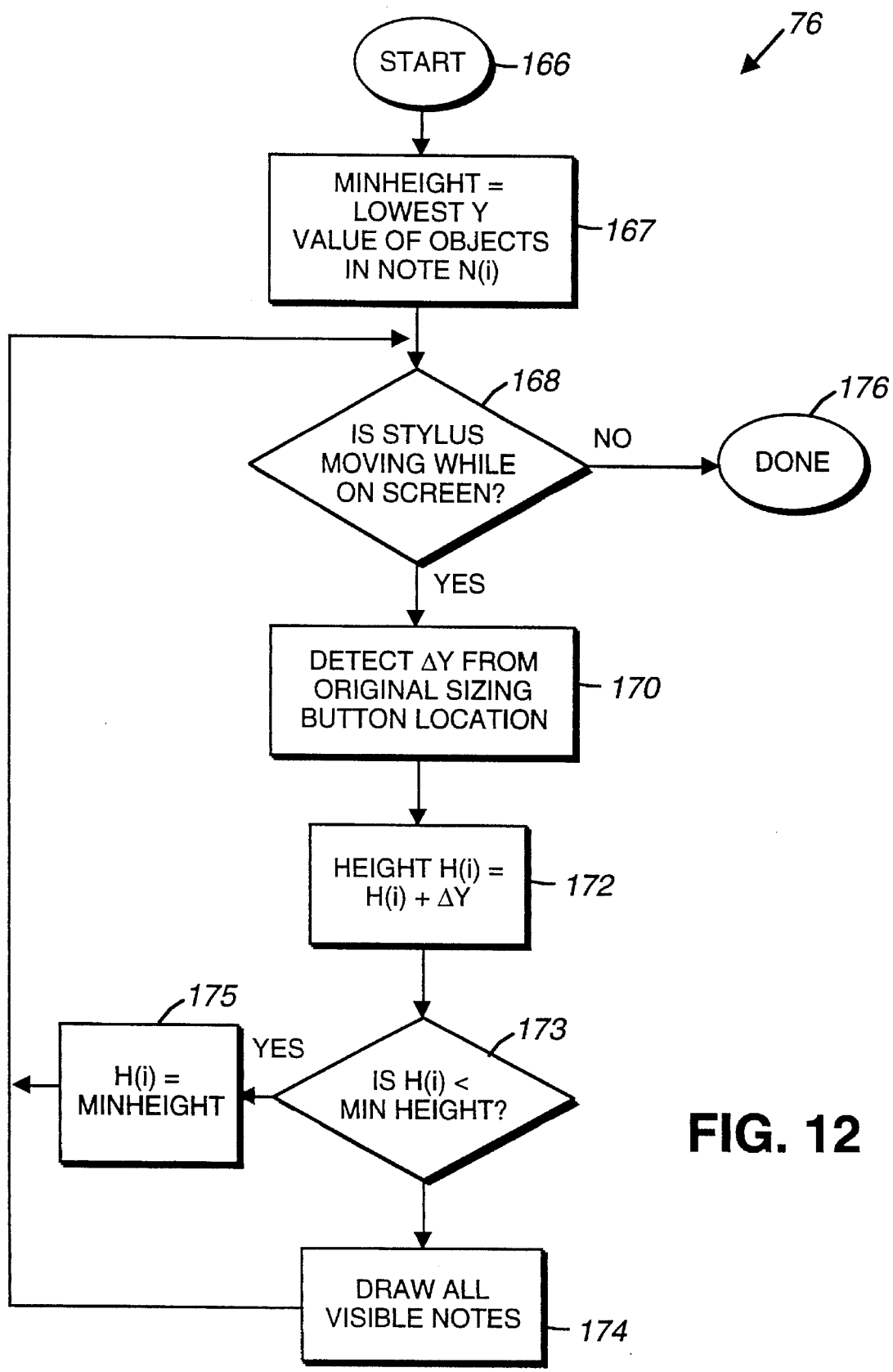
FIG. 12 is a flow diagram illustrating a method for processing the sizing gesture detected by the method illustrated in FIG. 11.

The process sizing step 76 is illustrated in greater detail in FIG. 12. The process begins at 166, and a process step 167 initializes a variable MIN HEIGHT to the lowest Y coordinate of the objects in current note N(i). This step simply requires analysis of the Cartesian coordinates of the objects in the note N(i) to identify the point with the lowest Y value. Next, decision step 168 determines whether the stylus is moving while it is still on the screen. As will be appreciated by those skilled in the art, this is easily accomplished by analyzing the series of data points provided by the display assembly 20 whenever the stylus is in contact with the screen 52. If it is, the CPU 12 concludes that the user is making a sizing gesture to note N(i). Under these circumstances, step 170 calculates a vertical distance ΔY that is the difference between the current stylus location and the original location of the header bar. The data record R(i) is then modified for note N(i) such that the height H(i) is set to H(i)+ΔY in a step 172.

Generally, moving the header bar can be used to reduce as well as increase a note to any size. However, preferred methods of the invention prevent any part of the text, graphical, or data objects of the note from becoming obscured from view if the height of the note is insufficient to accommodate them. This is accomplished by decision step 173 and process step 175. In decision step 173, the CPU 12 determines whether H(i) is less than MIN HEIGHT. If so, process step 175 sets H(i) equal to MIN HEIGHT thus preventing any part of the objects in the note from becoming obscured. Process control then returns to step 168. If the CPU 12 determines that H(i) is not less than MIN HEIGHT in decision step 173, a step 174 draws all visible notes on the screen 52 and process control returns to step 168. As long as the stylus is moving on the screen, steps 168, 170, 172, 173, and 174 are repeated. However, when the stylus stops moving on the screen as determined in by step 168, the process is completed as indicated at 176.

Although the above discussion describes methods in which a header bar is used to change the size of a note, other icons besides the header bar could also be used. For example, a sizing "button" could be provided on the header 53. By placing the stylus on the sizing button and making a sizing gesture, the size of the current note could be changed in a manner analogous to that described in connection with FIGS. 11 and 12.

Figure 13:
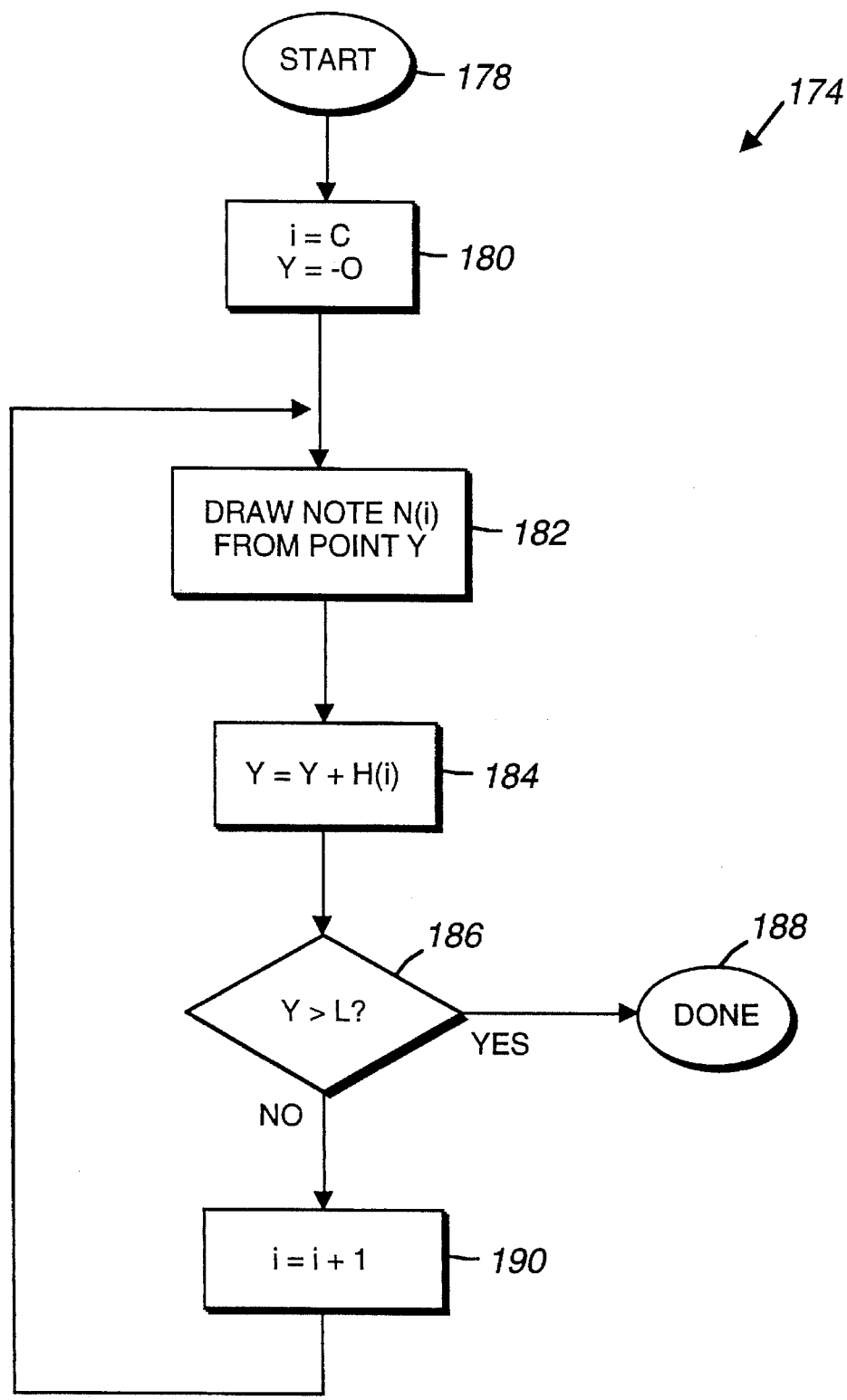
FIG. 13 is a flow diagram illustrating a method for drawing all visible images on the screen of a computer display assembly.

FIG. 13 illustrates a process 174 for re-drawing all visible notes on the screen 52 of the pen-based computer system 10. The step 174 is preferably implemented by graphics software such as QUICKDRAW from Apple Computer, Inc. of Cupertino, Calif. In general, processes for drawing lines on a computer screen are well known to those skilled in the art. A description of the QUICKDRAW graphics software is found in the book *Inside Macintosh. Volumes I, II, and III*, by C. Rose et al., Addison-Wesley Publishing Company, Inc., July 1988. With such graphics software, a header bar, for example, can be drawn by simply specifying the coordinates of the beginning and the end of the bar, along with the thickness of the bar, its pattern, etc.

The process 174 begins at 178 and initializes variables in a step 180. Two of these variables include the counter i which is set to the current note number C, and the variable Y which is set to the negative of the offset O. Next, in step 182, the note N(i) is drawn from the point Y, i.e., from the current offset position. This step 182 includes the sub-steps of drawing the header bar B(i), the date D(i), the note number i, the text object TEXT(i), the graphic object GRAPHIC(i), the data object DATA(i), etc. This will result in an image of part or all of note N(i) being displayed on the screen 52. Next, in a step 184, the variable Y is increased by the height of note N(i) i.e., Y=Y+H(i). In a decision step 186, the value of Y is compared to L, the length of the screen 52. If Y is greater than L, then the process 174 is completed as is indicated at 188. Otherwise, the counter i is incremented by 1 in a step 190 and steps 182, 184 and 186 are repeated. Essentially, the decision step 186 determines whether part or all of the next note will fit on the screen, and if it will, the CPU 12 causes that partial or complete note to be drawn on the screen. Steps 182–190 are repeated until all visible notes are displayed on the screen 52.

Figure 14:
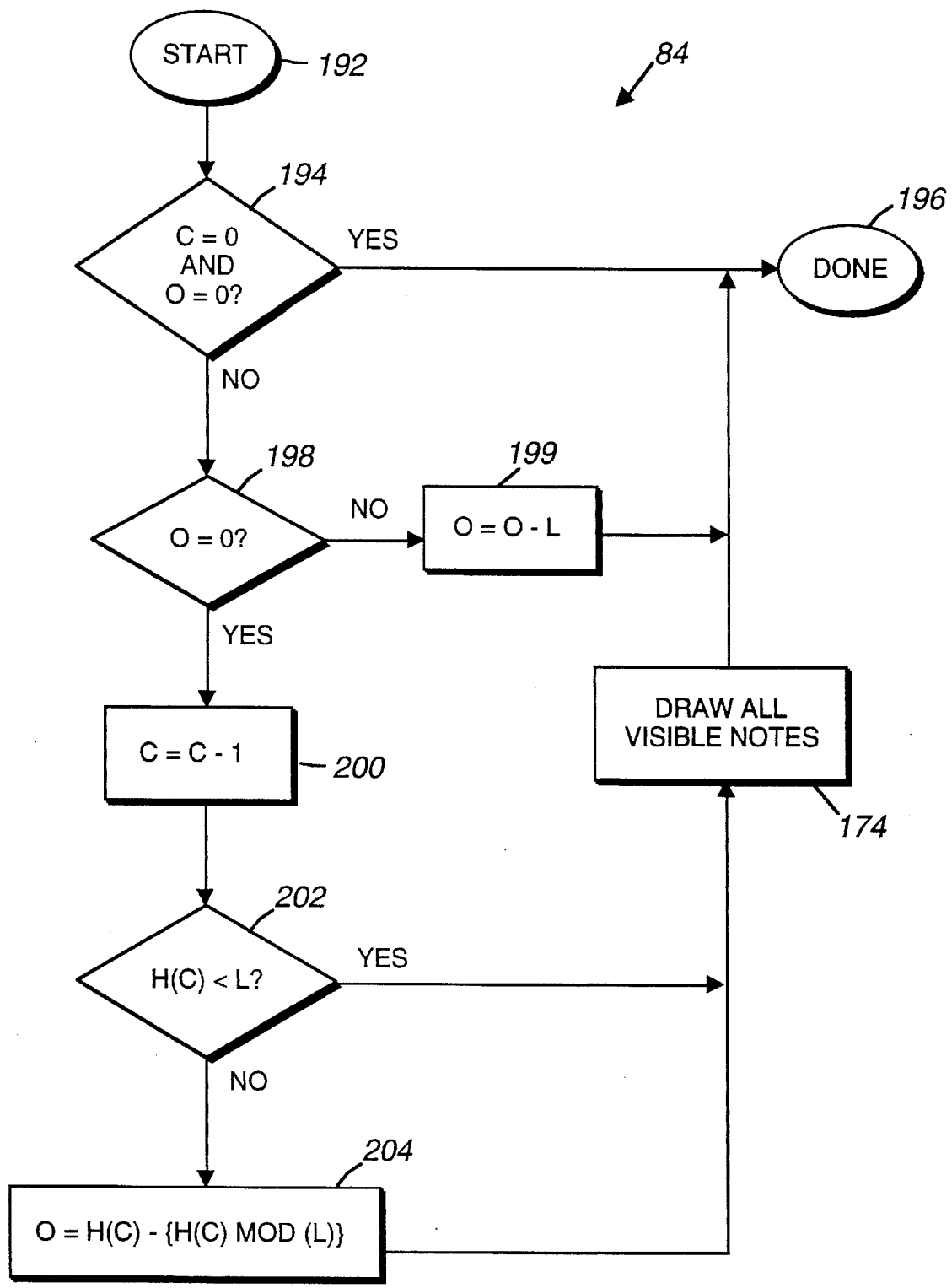
FIG. 14 is a flow diagram of a method for making a quantized up-scroll through notes on a computer screen.

In FIG. 14, the step 84 of processing the up-scroll is illustrated in greater detail. The process begins at 192, and a decision is made as to whether the current note number C and the current offset O are both equal to zero in a step 194. If they are, the header bar B(1) of note N(1) is at the top of the screen 52 and no further up-scrolling is possible as indicated at 196. Otherwise, step 198 determines whether the offset is equal to zero, and if it is not then the value of the offset O is reduced by the length of the screen L in a step 199 so that another screen-full of images can be displayed. If the offset O is equal to zero, the current note number C is decremented by 1 in a step 200, and in a step 202 it is determined whether the height H(C) of note N(C) is less than L, the length of the screen 52. If it is less, the entire note N(C) will fit on the screen 52. If H(C) is not less than L, the entire note N(C) will not file on the screen 52 and a new offset O is calculated as indicated in step 204. This new offset O is equal to:

$$O=H(C)-\{H(C) \bmod L\}$$

where {H(C) MOD L} is the modulus of H(C) and L, i.e. it is equal to the remainder of the quotient H(C)/L. Finally, after steps 199 or 204 are completed or if the decision step 202 is true, all visible notes are drawn in step 174 before the completion of the process at 196.

Figure 15:
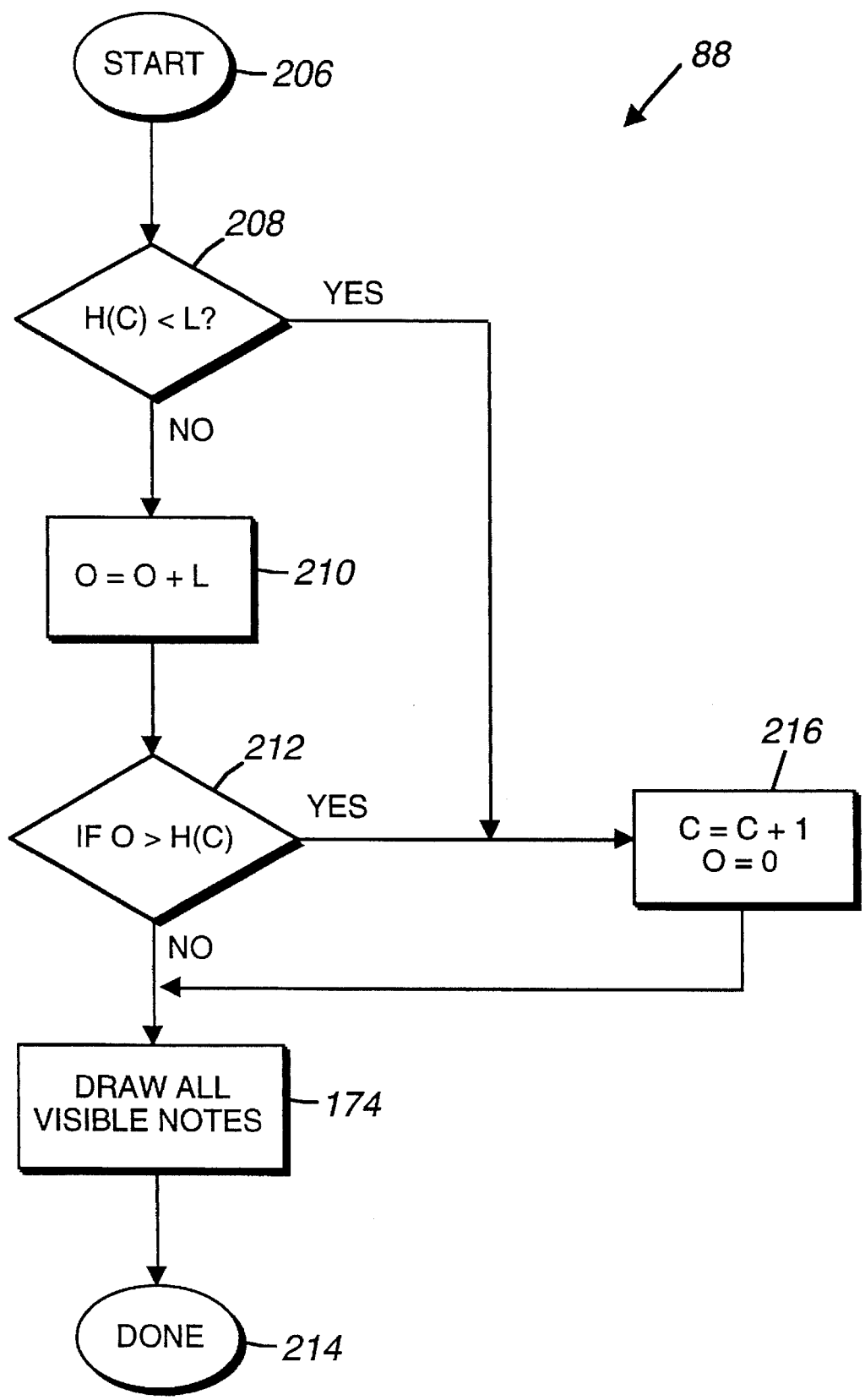
FIG. 15 is a flow diagram which illustrates a method for making a quantized down-scroll through notes on a computer screen.

The process down-scroll step 88 is illustrated in greater detail in FIG. 15. The process starts at 206, and the height H(C) of the current note C is compared with the length L of screen 52 in a step 208. If the height is less than the screen length, then the offset O is increased by the length of the screen L in a step 2 10. Next, in step 212, the offset is compared with the height H(C) of the current note and, if it is less than that height, all visible notes are drawn in a step 174 and the process is completed as indicated at 214. Otherwise, if step 212 determines that the offset O is greater than the height H(C) of the current note, the current note C is incremented by 1 and the offset O is set to zero in a step 216.

Figure 16:
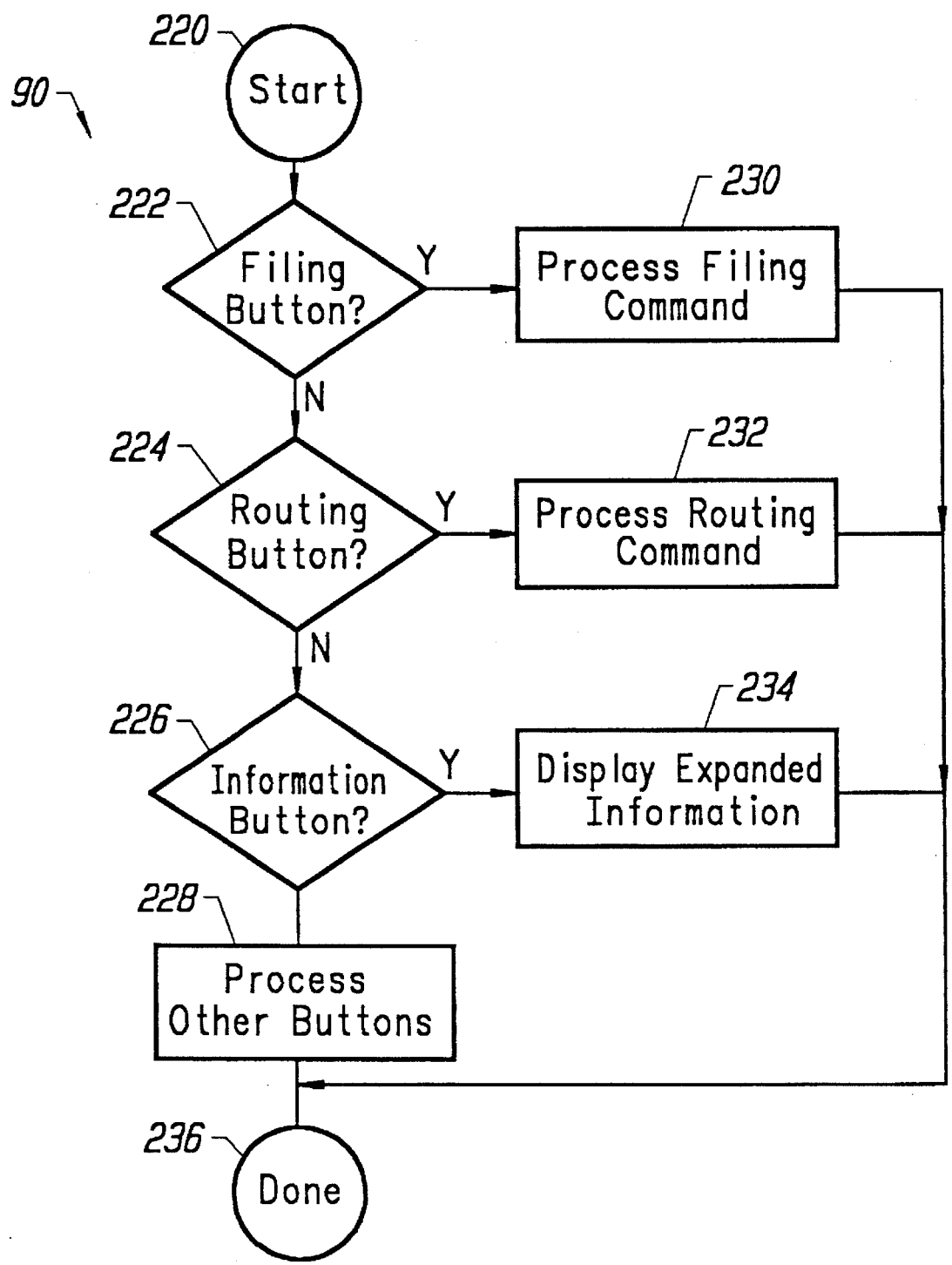
FIG. 16 is a flow diagram illustrating a method of processing selection of header function buttons.

FIG. 16 illustrates the steps employed to "process other buttons" (i.e., step 90). In particular, FIG. 16 illustrates how the header function buttons 51A, 51B, and 51C of header 53 are processed. The process begins at a step 220 and proceeds to a decision step 222 where the CPU 12 determines whether the stylus is on a filing button 51B of header 53. If it is, the filing command is processed at a process step 230 and the process is completed at a step 236. If it is not, a decision step 224 determines whether the stylus is on a routing button 51C of header 53. If it is on a routing button, the routing command is processed at a process step 232 and the process is then completed at step 236. If the stylus is not on a routing button, a decision step 226 determines whether it is on an information button 51A of header 53. If so, process step 234 displays expanded information and then completes the process at step 236. If it is determined that the stylus is not on an information button (or a filing or routing button), then another button is processed at a process step 228. Such buttons might include, for example, the input buttons on keypad 24'.

Figure 17:
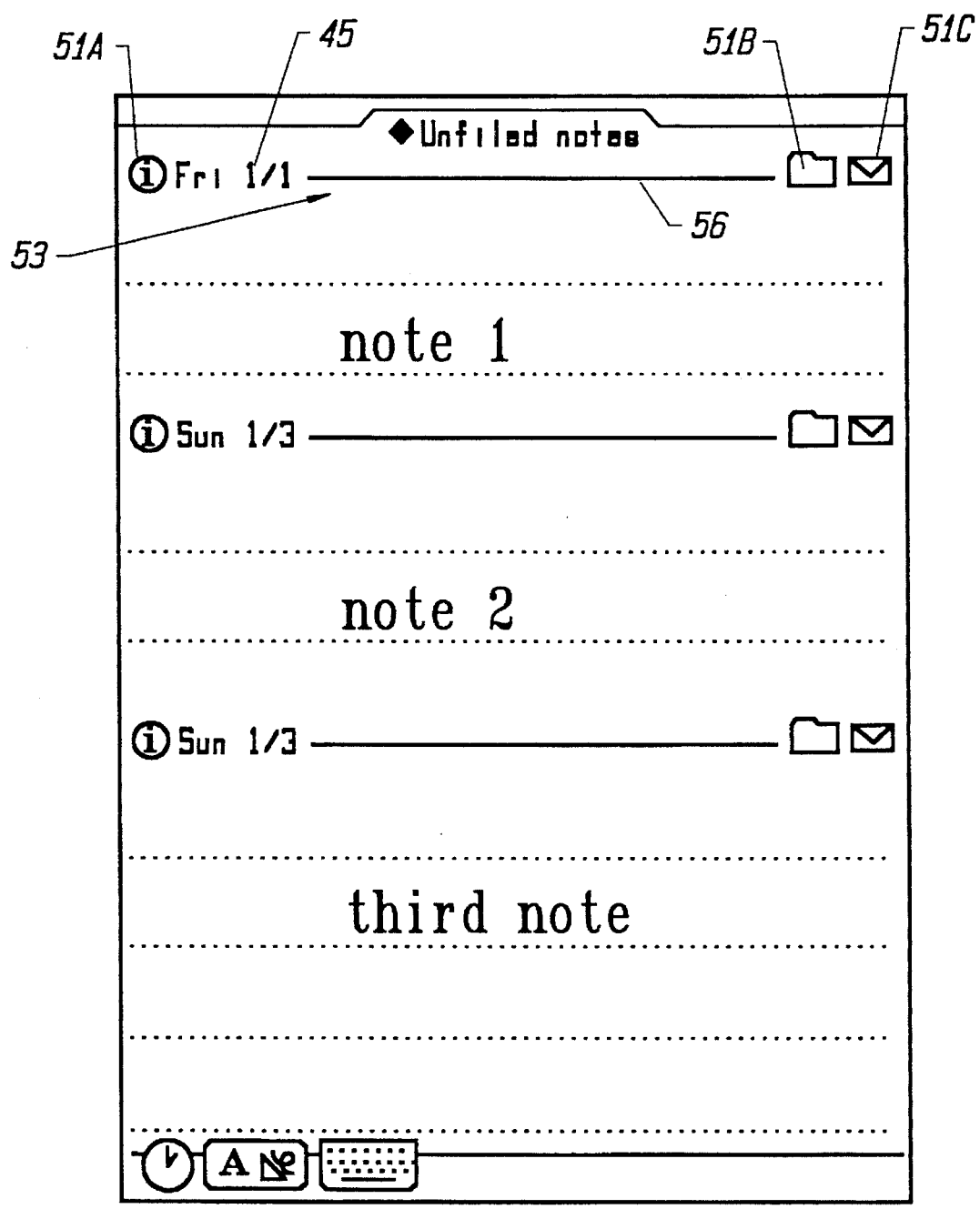
FIG. 17 is a screen shot showing a header created by a division gesture.
Figure 18:
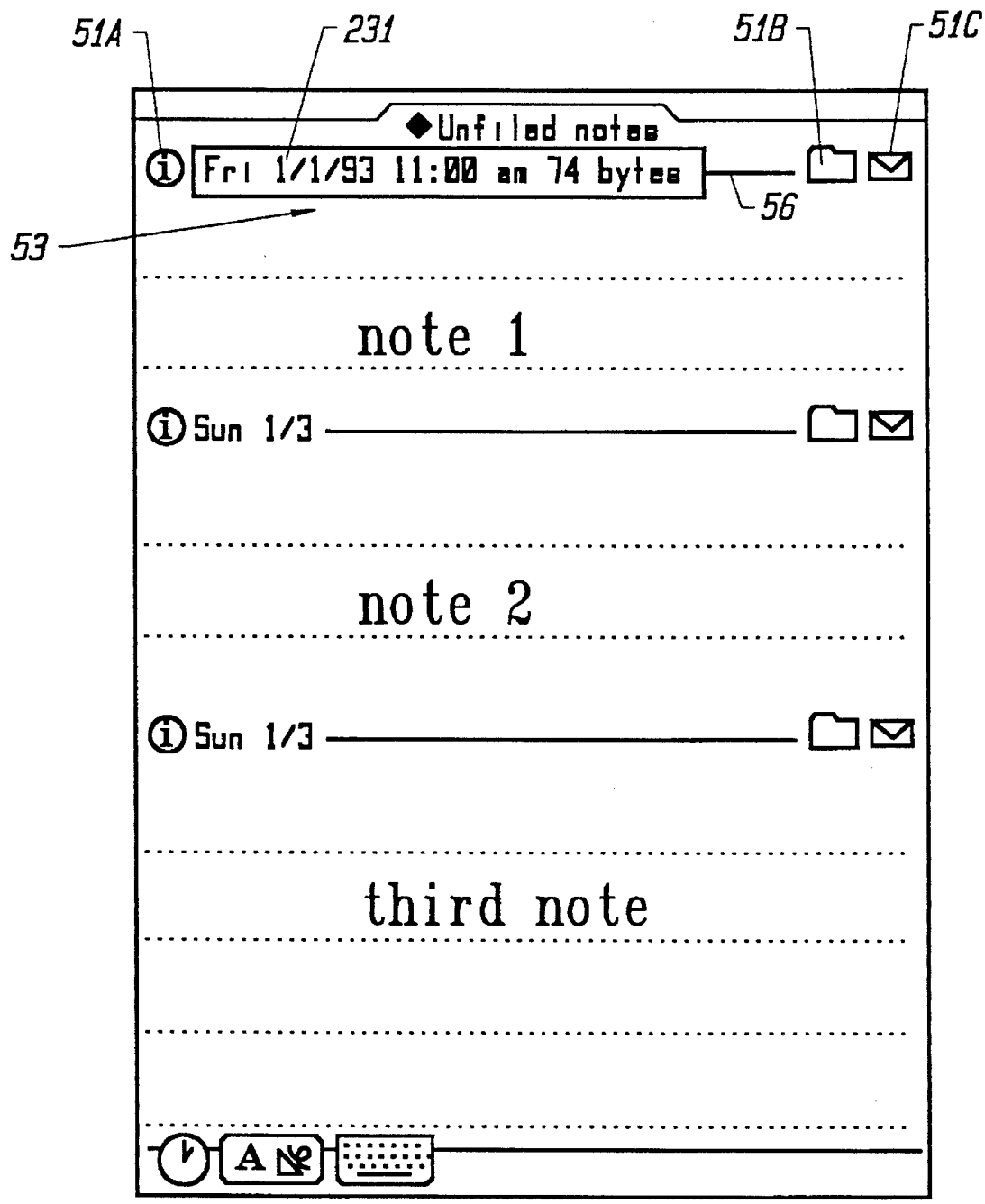
FIG. 18 is a screen shot of the header of FIG. 17 after an information area header button has been depressed.

FIG. 17 is a screen illustration of the header 53 containing header bar 56 and the header function buttons 51A, 51B, and 51C described in connection with FIG. 16. As shown in FIG. 17, an abbreviated day of the week and a day of the month 45 are normally displayed to the immediate right of the information button 51A. When the information button 51A is depressed, expanded information 231 is displayed as shown in FIG. 18. Although various items can be presented in the expanded display, in a preferred embodiment the full date (including the year), the time, and the size of the note (in e.g., bytes) are presented. In FIG. 18, the expanded display shows that the first note "note 1" contains 74 bytes. In both FIGS. 17 and 18, the filing button 51B is shown as a folder icon and the routing button 51C is shown as an envelope icon. Appearing at the top of the screen, a reminder tells the user that the notes appearing below are unfiled.

As noted, in step 228, the CPU 12 processes other buttons that might be selected by the user. One such other button is an "overview" button 49 shown in FIG. 2 between the scroll up arrow 66a and the scroll down arrow 66b on keypad 24. The overview button provides a navigational tool within the notepad or other application. When overview button 49 is depressed while the user is in the notepad application, for example, a summary of each note in the note pad is displayed. In a preferred embodiment, the summary is simply a one line reference to the note. If the note is a text note, for example, the summary preferably includes a short excerpt or command from the note. If the note is a graphics note, the summary preferably will simply state that the note is a graphics note. While the summary is displayed, the user can select a particular note by touching the stylus to its location on the screen. The system will then automatically bring up the selected note (or the top of that note if it is larger than the screen) to the screen. In applications other than the notepad, depressing the overview button 49 will also cause a summary of the entries for that application to be displayed. For example, a geography application that normally shows a map of the world could provide—upon selecting the overview button 49—a list of cities provided in the application. If the user then selects a particular city from the summary, the application will be directed to display further detailed information about the selected city.

Figure 19:
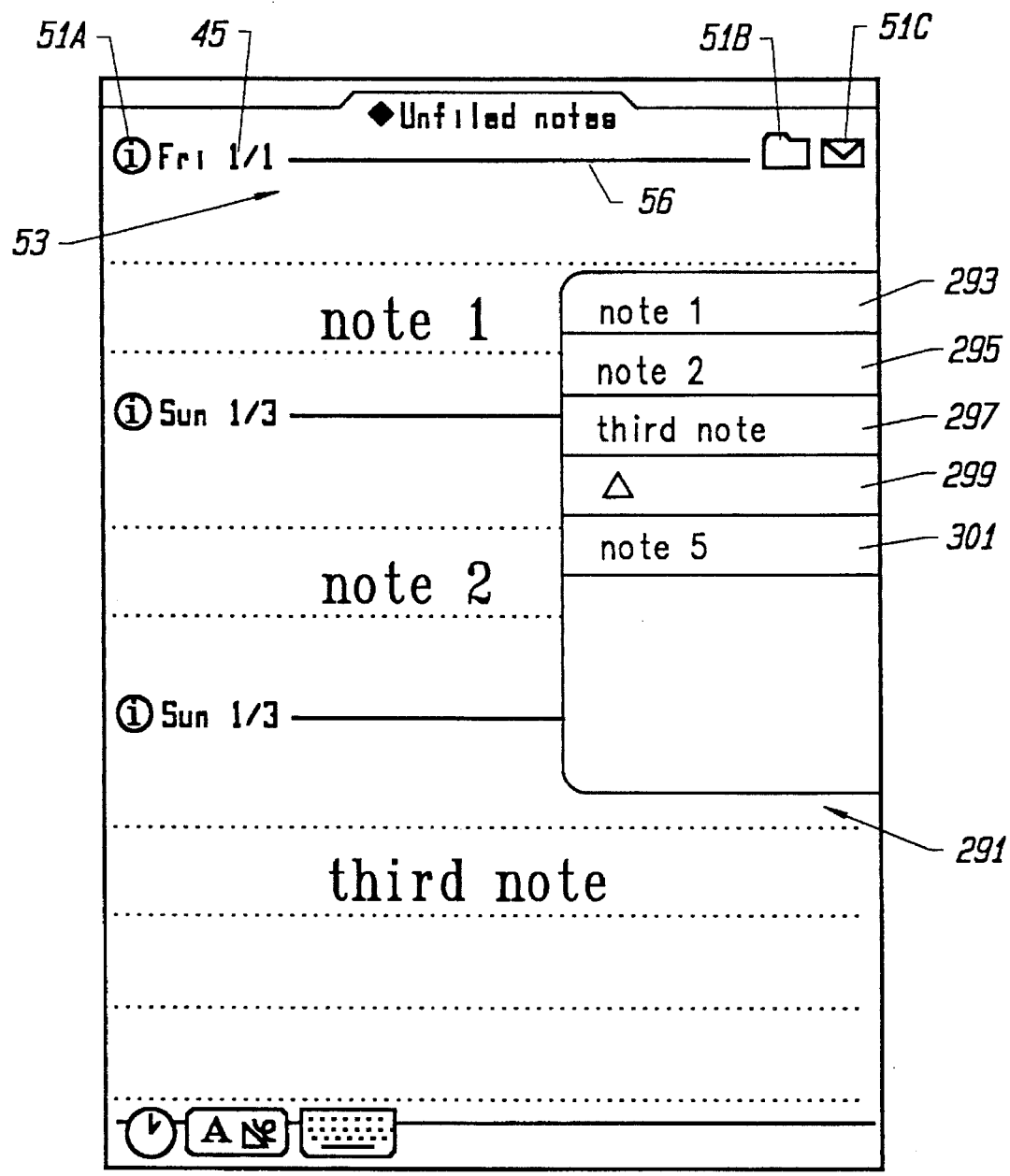
FIG. 19 is a screen shot of a summary slip created according to this invention when an overview button is selected.

FIG. 19 is a screen display illustrating how a summary of the notes in a notepad application might appear if a overview button 49 has been selected. The summary is contained in a summary slip 291 overlying the notepad display. The regions of the notepad not covered by the summary slip still display the contents of the notes. Summary slip 291 displays five entries in summary form. Entries 293, 295, 297, and 301 indicate notes containing text. Entry 299 which displays a triangle indicates a note containing a graphic object. Rather than displaying the actual graphics contained within a graphics note in summary form, the system may simply display an icon telling the user that the note contains graphics. In this example, that icon is a triangle.

Figure 20:
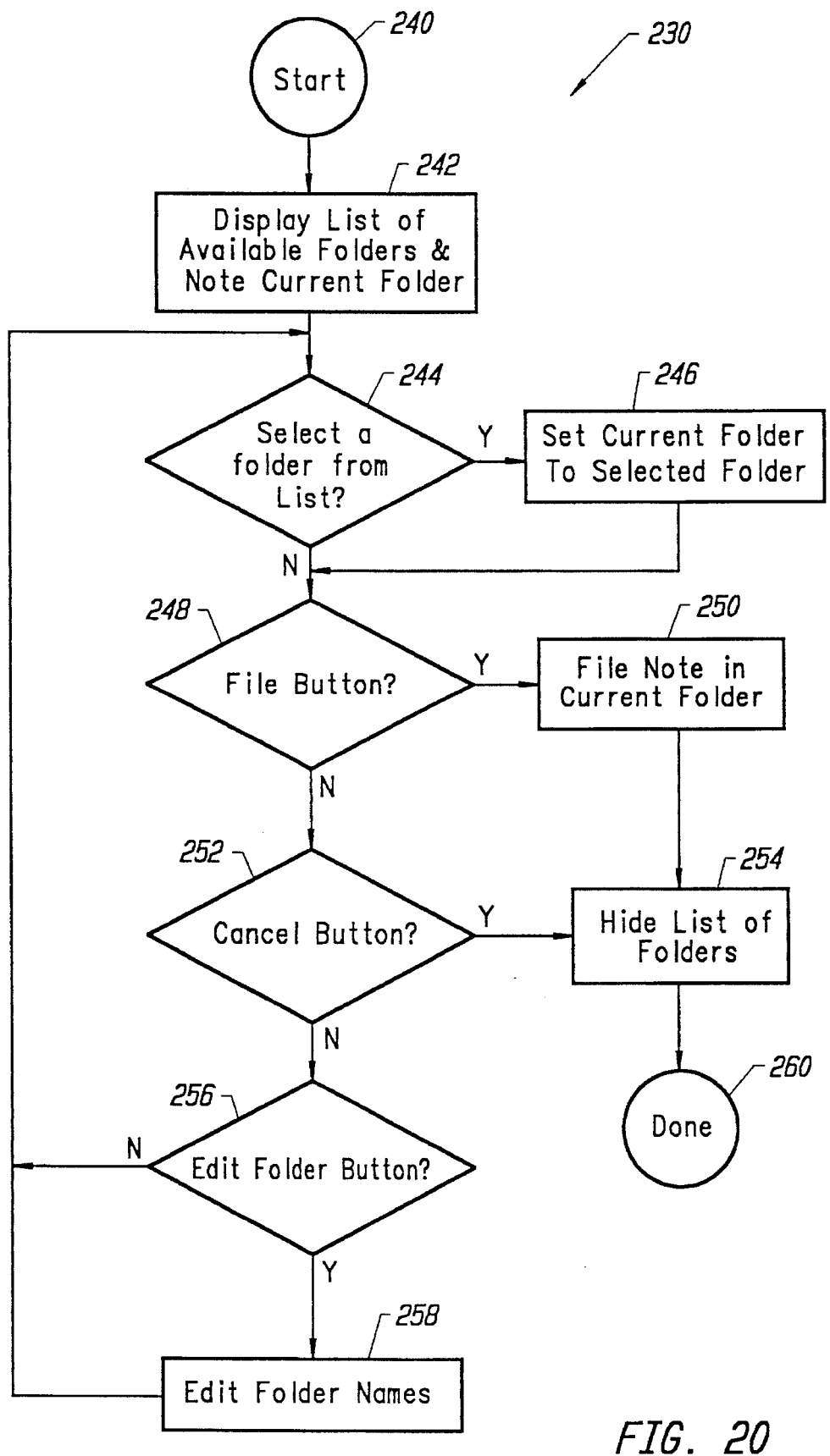
FIG. 20 is a flow diagram illustrating the process of filing a note after a filing button on the header has been depressed.

FIG. 20 shows a process by which a filing command (step 230) is processed according to the present invention. The process begins with a step 240 when the fling button 51B is depressed with the stylus 38. Next, a process step 242 displays a list of folders in a menu format and notes the "current folder" by marking, highlighting, etc. The "current folder" is the folder in which the note would be filed if instructions to file the note were received. In addition to the list of folders, specific buttons are displayed including a "file" button, a "cancel" button, and an "edit folder" button. After the list of folders is displayed, the CPU determines (in a decision step 244) whether a particular folder name from the list of folders has been selected by touching the stylus to the screen at a folder name on the menu. If so, a process step 246 sets the current folder to the folder name selected and the process then moves to a decision step 248. If on the other hand, a folder name has not been selected, process control moves directly from decision step 244 to decision step 248. Decision step 248 determines whether the "file" button has been selected by touching the stylus to that button. If so, the note immediately below header 53 is filed in the current folder at a step 250 and the process moves to a process step 254 which hides the list of folders. The process is then completed at a step 260. When a note has been filed in a folder by this process, it is thereafter available in that folder unless the user moves it.

If the file button has not been selected in step 248, the process moves directly to decision step 252 without filing the note. Decision step 252 determines whether the "cancel" button has been selected (e.g. depressed by the stylus). If so, the process moves to process step 254 which hides the list and completes the process at step 260. If the cancel button has not been depressed, the process moves from decision step 252 to a decision step 256 which checks whether the "edit folder" button has been depressed. If so, the process moves to process step 258 which edits the folder names according to the user's instructions and then returns to step 244. In step 258, the user may change the name of an existing file and/or add a new folder. If the edit folder button has not been depressed, the process returns directly to step 244 from step 256. There the CPU again determines whether a specific folder from the displayed list has been selected, and the process proceeds as described above. The process is completed when the user either depresses the file or cancel button.

Figure 21:
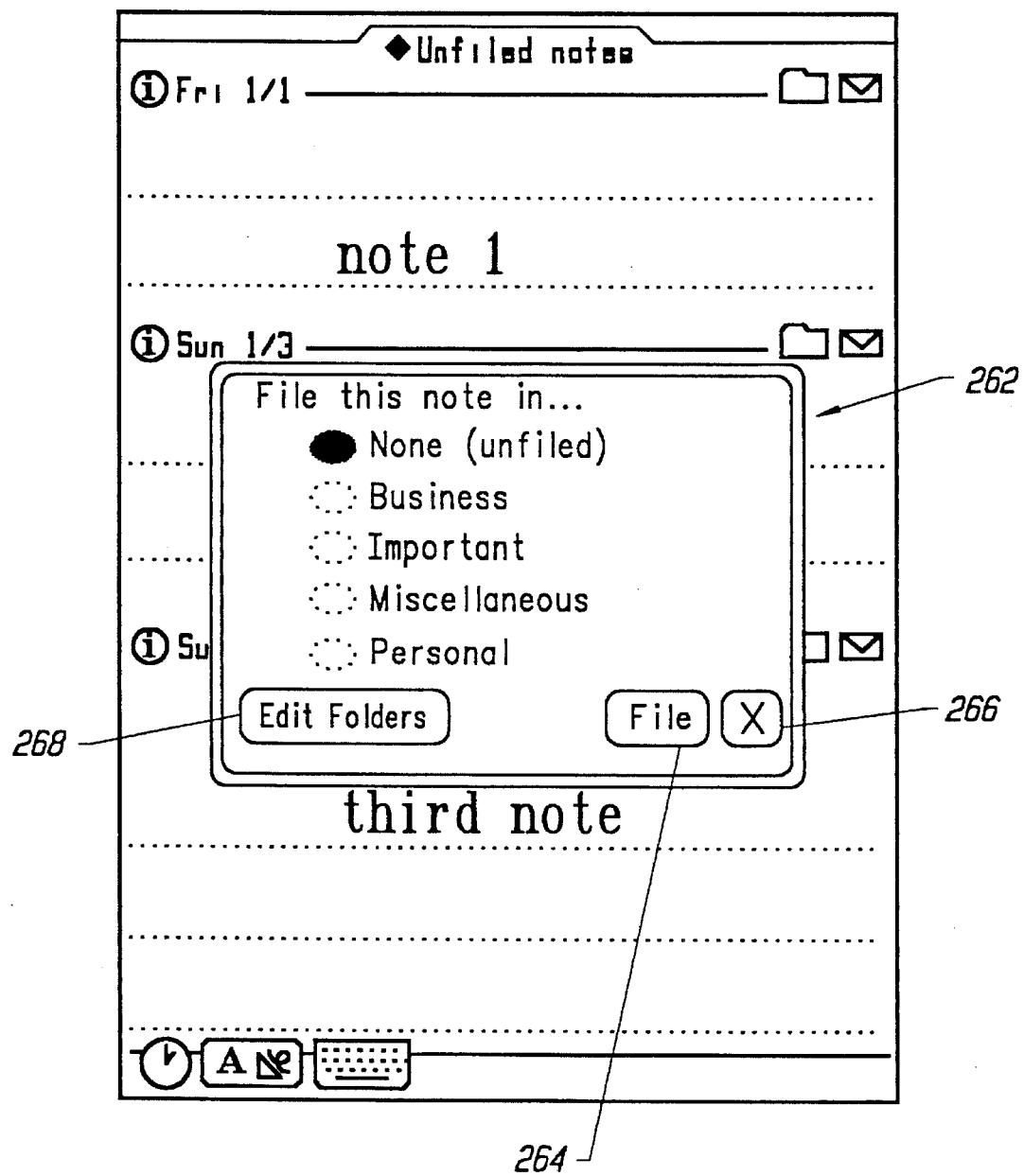
FIG. 21 is a screen shot of the header of FIG. 17 after a filing header button has been depressed.

FIG. 21 shows how the screen 52 might appear after the filing button is selected at step 222. As shown, a menu 262 containing the list of folders is displayed in the center of the screen, overlying the notes. The list includes "None (Unfiled)," "Business," "Important," "Miscellaneous," and "Personal." In addition to the list of files, the menu contains the file button 264, the cancel button 266 (shown as an "X"), and the edit folder button 268.

Figure 22:
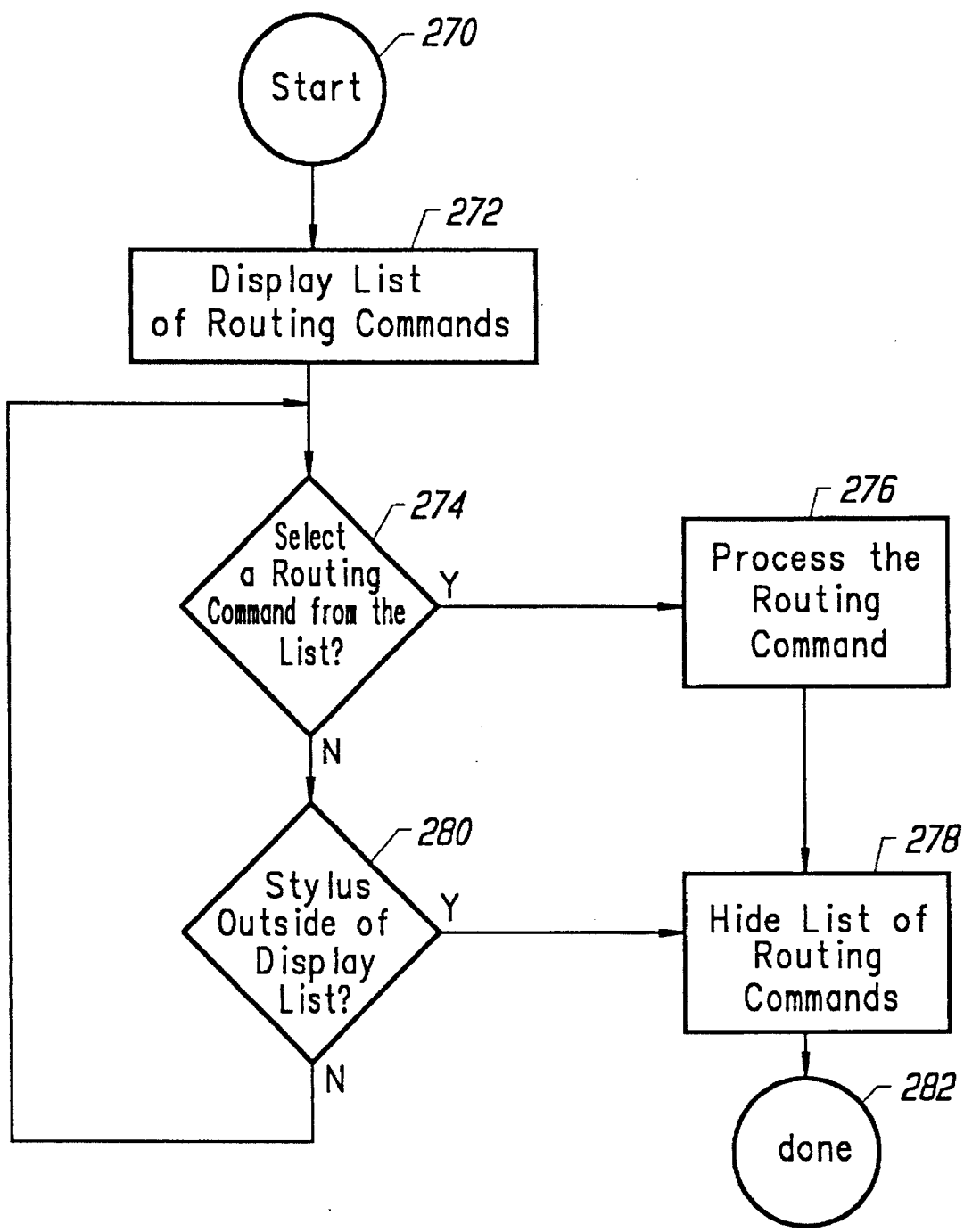
FIG. 22 is a flow diagram illustrating the process of routing a note after a routing header button has been depressed.

FIG. 22 shows a process by which a routing command (step 232) is processed according to the present invention. The process begins at a step 270 when the routing button 51C is depressed with the stylus 38. At that point, the process moves to process step 272 which displays a routing menu (or "routing slip") containing a list of routing commands. These commands include, for example, "Print Note," "Fax," "Beam," "Mail," "Duplicate," and "Delete." Next, a decision step 274 determines whether a routing command has been selected. If so, that command is processed at process step 276 and the menu containing the list of routing commands is hidden at step 278. At this point, the process is completed as indicated at step 282. The routing command is processed by directing the system to take the requested action according procedures well known in the art. Thus for example, a "Print Note" command would include steps of converting the note to a format that could be understood by a printer and sending that note with printing instruction to a printer. If a printer is not available, the system could, for example, hold the formatted note in memory until the user subsequently issues a print command. Some routing commands also employ additional steps. For example, a "Mail" command might first bring up a selected note within a letter template including the recipient's full name and address in the top left corner of the sender's letterhead. Other information such as an appropriate closing sentence might also be added. After the user makes any appropriate modifications to the letter format, the system electronically routes the letter to the recipient.

If decision step 274 in FIG. 22 determines that a routing command from the routing slip has not been selected, the process moves to decision step 280 which determines whether the stylus has touched a region outside of the routing menu. If it has, the process moves to step 278 which hides the list of routing commands and then completes the process at step 282. If decision step 280 determines that the stylus has touched a point inside of the routing menu, process control returns to step 274 where the system determines whether a particular routing command has been selected.

Figure 23:
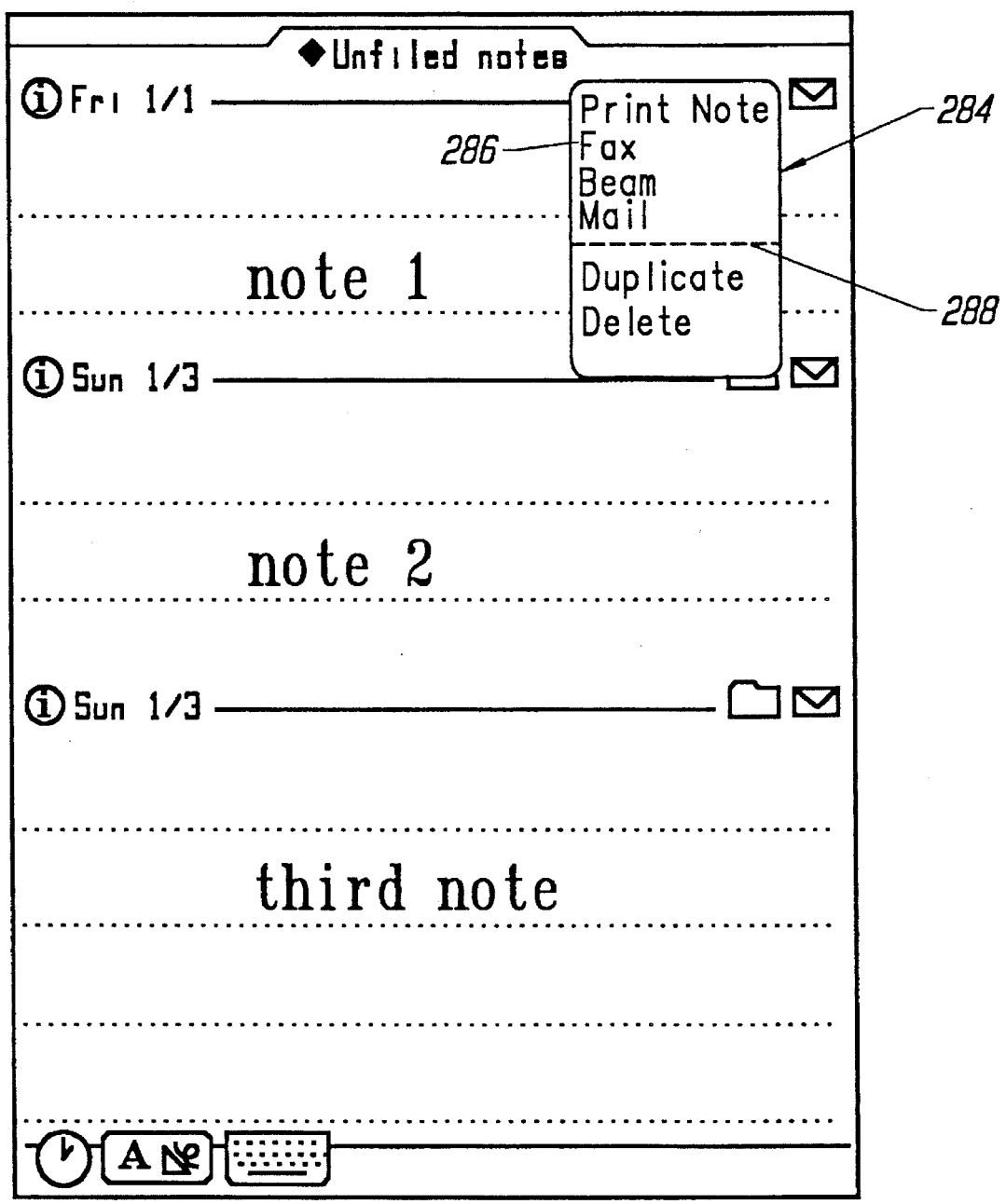
FIG. 23 is a screen shot of the header of FIG. 17 after a routing header button has been depressed.

FIG. 23 shows a screen illustration of a note containing a routing slip 284 after the routing button 51C has been depressed. The menu 284 includes a list of routing commands 286 including "Print Note," "Fax," "Beam," "Mail," "Duplicate," and "Delete." Of course, other routing commands such as "copy to PCMCIA card" could also be listed if such commands are available to the system. As shown, the routing commands are divided into two groups by a divider line 288. The first group includes commands that involve transmitting a note outside the system, and the second group includes commands that can be implemented within the system. Of course, routing slips having other organizations could also be employed. As described in connection with FIG. 22, by touching the stylus to the region of screen 52 where a routing command is displayed on menu 284, the user selects that routing command for processing.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit of the present invention. For example, while the creation of new notes has been described as the division of previous notes, it is also possible to characterize note creation as adding additional notes to one or more previous notes. It is therefore intended that the following appended claims include all such alterations, modifications and permutations as fall within the true spirit and scope of the present invention.

What is claimed is:

1. A method for manipulating notes on the screen of a computer display, the method comprising:

generating an initial note area on a screen of a computer display;

dividing said initial note area into a plurality of note areas in response to at least one division gesture implemented by moving a pointing means across the width of the screen such that a left edge of the division gesture is within a first defined distance of a left side of said computer display and a right edge of the division gesture is within a second defined distance of a right side of said computer display, wherein the division gesture is made in a horizontal motion having a slope of less than a predefined slope value, wherein each division gesture creates divider indicia on said semen which visually separates two adjacent note areas and which divider indicia includes one or more header function buttons specifying a command to be taken on a note associated with the divider indicia;

modifying the size of a selected note area in response to a sizing gesture made to a divider indicia associated with said selected note area; and scrolling at least some of the plurality of note areas such that they are sequentially displayed in response to a scrolling command, wherein the plurality of note areas have arbitrary sizes and are at least initially delimited by the division gestures.

2. A method as recited in claim 1 wherein said step of generating an initial note area on a computer screen includes creating a first data structure including a note number and a note dimension.

3. A method as recited in claim 1 wherein said step of dividing said initial note area comprises:

detecting a theoretical line drawn on said display by said pointing means;

determining whether said theoretical line is a division gesture; and generating a header bar on said computer display for a new note area if said theoretical line is determined to be a division gesture.

4. A method as recited in claim 3 wherein said step of detecting a theoretical line comprises:

collecting a plurality of sample points corresponding to a movement of said pointing means across said display; and creating said theoretical line from at least two of said plurality of sample points.

5. A method as recited in claim 4 wherein said step of determining whether said theoretical line is a division gesture implemented by said pointing means on said screen includes one or more of the following steps:

determining whether there is a sample point farther from said theoretical line than a predetermined maximum distance value;

determining whether the absolute value of a sum of the signed distances of said plurality of sample points from said theoretical line is greater than a predetermined maximum sum value;

determining whether the absolute value of a slope of said theoretical line differs from a predetermined slope by more than a predetermined maximum slope value; and determining whether either end of said theoretical line is separated from an edge of said screen by more than a predetermined maximum margin value.

6. A method as recited in claim 1 wherein said step of modifying the size of a selected note area comprises:

detecting said sizing gesture; and moving said divider indicia as indicated by said sizing gesture.

7. A method as recited in claim 1 wherein said step of scrolling at least one note area comprises:

detecting said scrolling command; and scrolling said at least one note area in a direction indicated by said scrolling command such that divider indicia on said screen move in a quantized fashion.

8. A method for generating header divider indicia of note areas on a computer display comprising:

detecting a division gesture on a screen of a computer display as implemented by moving a pointing means across the width of the display such that a left edge of the division gesture is within a first defined distance of a left side of said computer display and a right edge of the division gesture is within a second defined distance of a right side of said computer display, wherein the division gesture is made in a horizontal motion having a slope of less than a predefined slope value; and generating a divider indicia header bar on said display as indicated by said division gesture, said divider indicia header bar visually separating two adjacent note areas and including one or more header function buttons specifying a command to be taken on a note associated with the divider indicia, wherein saw note areas have arbitrary sizes at least initially delimited by the division gestures, and wherein the note areas may be scrolled such that they are sequentially displayed in response to a scrolling command.

9. A method as recited in claim 8 wherein said step of detecting a division gesture comprises:

creating a theoretical line from a gesture made on said screen by said pointing means;

comparing said theoretical line to predetermined criteria; and recognizing a division gesture if said theoretical line meets said predetermined criteria.

10. A method as recited in claim 9 wherein said step of creating a theoretical line comprises:

collecting a plurality of sample points along a gesture path;

creating said theoretical line including at least two of said plurality of sample points.

11. A method as recited in claim 10 wherein said theoretical line is created from two of said sample points selected at or near opposing ends of said gesture path by using said two sample points as end points of the theoretical line.

12. A method as recited in claim 10 wherein said theoretical line is created from three or more of said sample points which are taken along said gesture path.

13. A method as recited in claim 12 wherein said theoretical line is created from at least a majority of said sample points by a least-mean-square (LMS) method.

14. A method as recited in claim 10 wherein said step of comparing said theoretical line to said predetermined criteria comprises:

determining whether any sample point is further from said theoretical line than a predetermined amount.

15. A method as recited in claim 10 wherein said step of comparing said theoretical line to said predetermined criteria comprises:

determining whether the absolute value of a sum of the signed distances of said plurality of sample points from said theoretical line is greater than a predetermined amount.

16. A method as recited in claim 10 wherein said step of comparing said theoretical line to said predetermined criteria comprises:

determining whether the absolute value of a slope of said theoretical line differs from a predetermined slope by more than a predetermined amount.

17. A method as recited in claim 10 wherein said step of comparing said theoretical line to said predetermined criteria comprises:

determining whether either end of said theoretical line is separated from an edge of said screen by more than a predetermined amount.

18. A method as recited in claim 8 wherein the one or more header function buttons specify commands selected from the group consisting of filing and routing.

19. A method for moving a divider bar indicia which separates two adjacent areas on a screen of a computer display at least one of said areas including a note which contains one or more objects, said method comprising:

detecting the selection of the divider indicia by a pointing means;

detecting a sizing gesture made with said pointing means;

comparing the position of the divider indicia with the position of the one or more objects;

moving said divider indicia as indicated by said sizing gesture by changing a dimension of said note so as to prevent any part of the one or more objects in the note from becoming obscured; and thereafter, re-drawing at least said note on said screen, wherein said divider indicia visually separates two adjacent note areas and includes one or more header function buttons specifying a command to be taken on a note associated with the divider indicia wherein said note areas have arbitrary sizes delimited by the divider indicia, and wherein the note areas may be scrolled such that they are sequentially displayed in response to a scrolling command.

20. A method as recited in claim 19 wherein said pointing means comprises stylus means contacting a screen of a pen-based computer system.

21. A method as recited in claim 20 wherein said sizing gesture comprises contacting said stylus means with said screen over header bar means of said divider indicia and moving said stylus means without lifting said stylus means from said screen.

22. A computer system comprising:

a processor;

a memory coupled to the processor;

a display coupled to the processor; and one or more computer-implemented processes running on the processor and residing, at least in part, in the memory, the processes including (a) means for detecting a division gesture made by a pointer on the display said division gesture implemented by moving the pointer across the width of the screen such that a left edge of the division gesture is within a first defined distance of a left side of said computer display and a right edge of the division gesture is within a second defined distance of a right side of said computer display, wherein the division gesture is made in a horizontal motion having a slope of less than a predefined slope value; and (b) means for creating a header at a location of the division gesture and a note associated with the header, said header visually separating two adjacent note areas and including one or more header function buttons specifying a command to be taken on a note associated with the divider indicia, wherein said note areas have arbitrary sizes at least initially delimited by division gestures, and wherein the note areas may be scrolled such that they are sequentially displayed in response to a scrolling command.

23. A computer system as recited in claim 22 further comprising means for routing the note to a location outside the computer system; and means for filing the note in one or more folders residing, at least in part, in the memory.

24. A computer system as recited in claim 23 wherein said routing means includes a routing button which forms a first part of said header and wherein said filing means includes a filing button which forms a second part of said header.

25. A computer system as recited in claim 22 wherein the one or more computer-implemented processes further comprise:

means for detecting a sizing gesture made with the pointer; and means for moving the divider indicia as indicated by the sizing gesture.

26. A computer system as recited in claim 22 wherein the one or more computer-implemented processes further comprise means for scrolling in a quantized fashion.

27. A computer system as recited in claim 22 wherein the one or more computer-implemented processes further comprise means for creating a data record for the note.

* * * * *